United States Patent
Castellani

(10) Patent No.: US 9,113,745 B2
(45) Date of Patent: Aug. 25, 2015

(54) INFUSION DEVICE FOR COFFEE MACHINES AND THE LIKE

(75) Inventor: Andrea Castellani, Milan (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 167 days.

(21) Appl. No.: 13/063,505

(22) PCT Filed: Sep. 18, 2008

(86) PCT No.: PCT/IT2008/000600
§ 371 (c)(1),
(2), (4) Date: Mar. 18, 2011

(87) PCT Pub. No.: WO2010/032271
PCT Pub. Date: Mar. 25, 2010

(65) Prior Publication Data
US 2011/0162530 A1    Jul. 7, 2011

(51) Int. Cl.
*A47J 31/40*    (2006.01)
*A47J 31/36*    (2006.01)

(52) U.S. Cl.
CPC .......... *A47J 31/3633* (2013.01); *A47J 31/3638* (2013.01)

(58) Field of Classification Search
CPC .......................... A47J 31/3638; A47J 31/3633
USPC ....... 99/302 P, 297, 295, 289 R, 323; 426/77, 426/594, 81, 82
See application file for complete search history.

(56) References Cited

U.S. PATENT DOCUMENTS

| | | | | |
|---|---|---|---|---|
| 4,789,106 | A * | 12/1988 | Weber | 241/101.2 |
| 5,776,527 | A * | 7/1998 | Blanc | 426/77 |
| 5,791,523 | A * | 8/1998 | Oh | 222/146.6 |
| 6,490,966 | B2 * | 12/2002 | Mariller et al. | 99/289 R |
| 8,166,869 | B2 * | 5/2012 | Cheng | 99/302 P |
| 8,210,096 | B2 | 7/2012 | Fin | |
| 2006/0230941 | A1 * | 10/2006 | Ryser et al. | 99/275 |

FOREIGN PATENT DOCUMENTS

| | | |
|---|---|---|
| EP | 1495702 A | 1/2005 |
| EP | 1721553 B1 | 1/2005 |
| IT | MI20071911 A1 | 4/2009 |
| WO | 2008096385 A1 | 8/2008 |

* cited by examiner

*Primary Examiner* — Jianying Atkisson

(57) ABSTRACT

An infusion device including an infusion chamber formed by portions movable with respect to each other along an opening and closing direction; a first duct for feeding an infusion liquid in the infusion chamber; a second duct for dispensing a food product from the infusion chamber; a pair of oscillating arms movable with respect to at least one of the portions forming the infusion chamber, along the opening and closing direction, and provided with retaining members for retaining a capsule in a space between the first and the second portion of the infusion chamber and for inserting said capsule inside the infusion chamber; divaricating members for causing the reciprocal divarication of the two arms and of the respective retaining members and the release of the capsule inside the infusion chamber; in one of the portions of the infusion chamber, an ejector for ejecting the capsule from the infusion chamber.

21 Claims, 30 Drawing Sheets

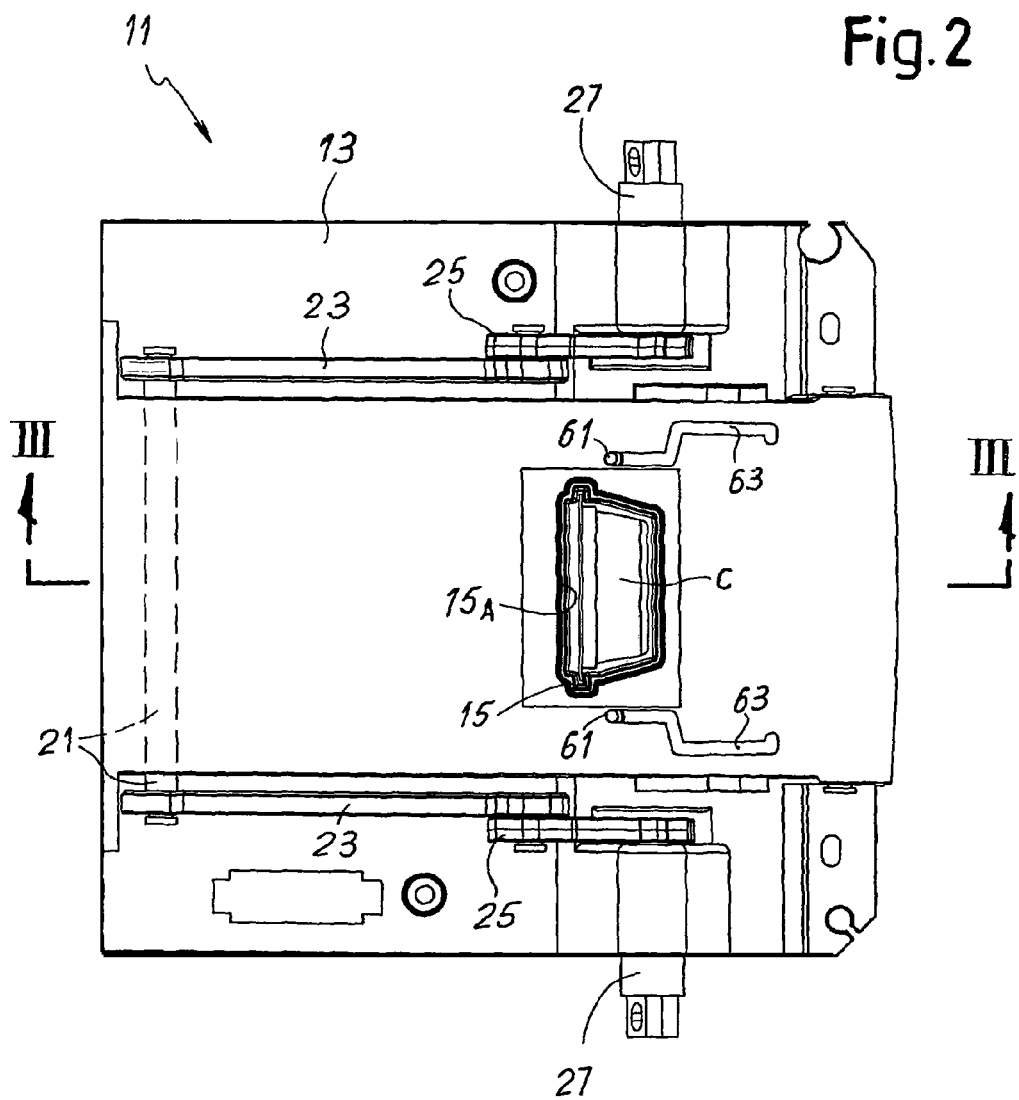

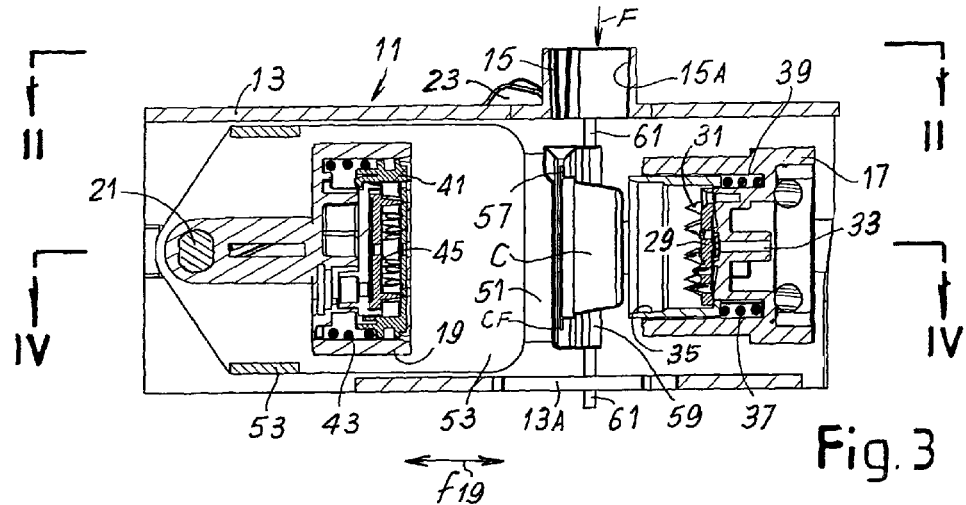
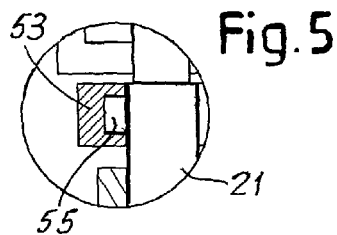
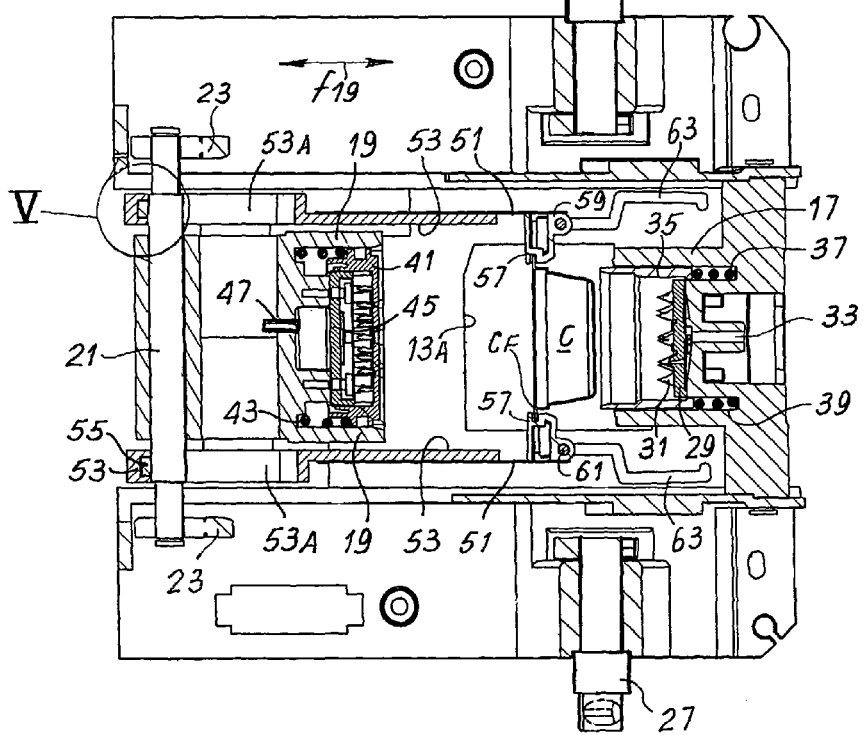

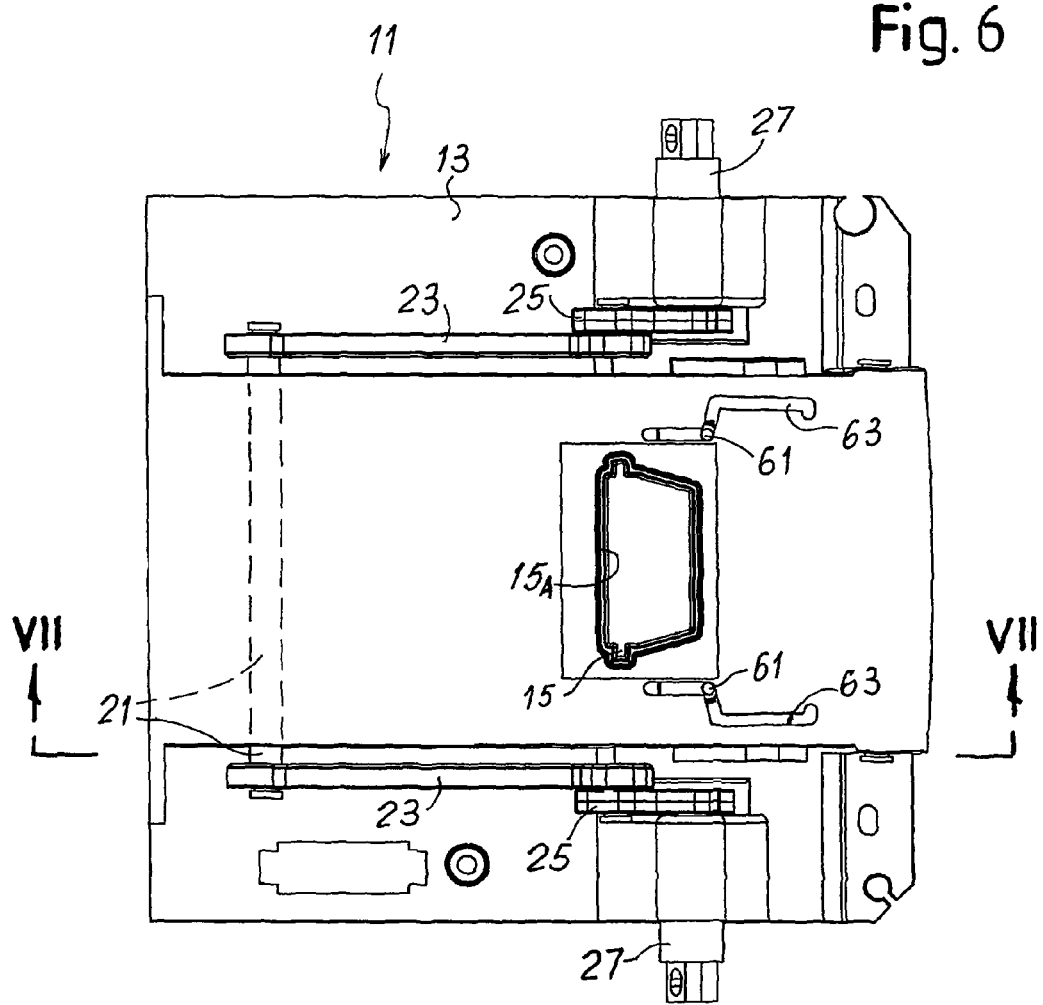

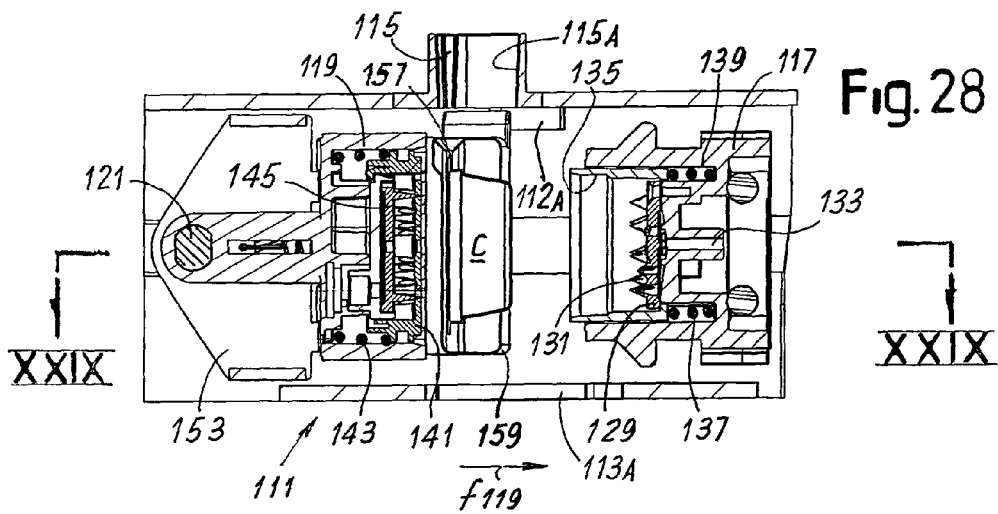

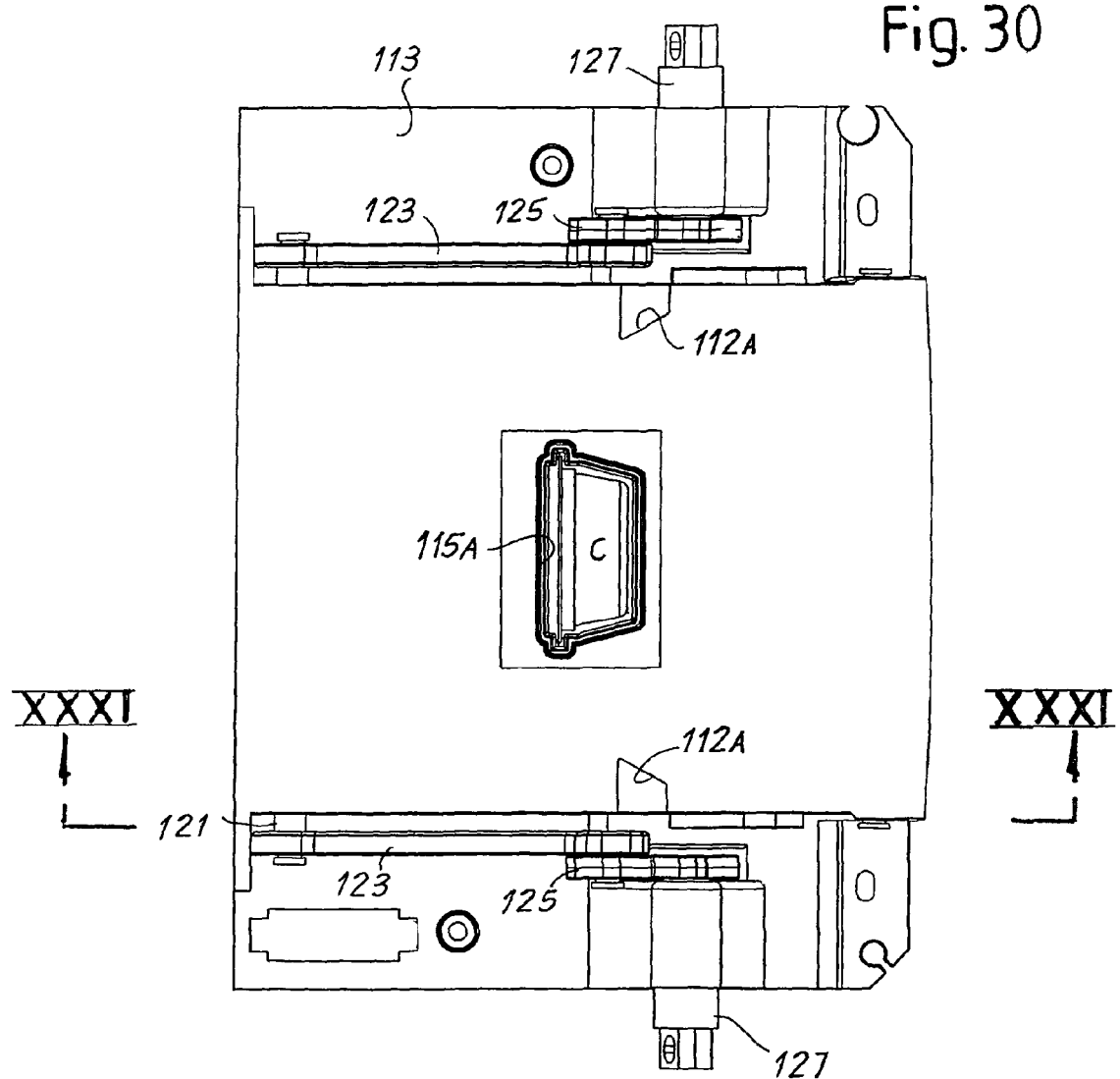

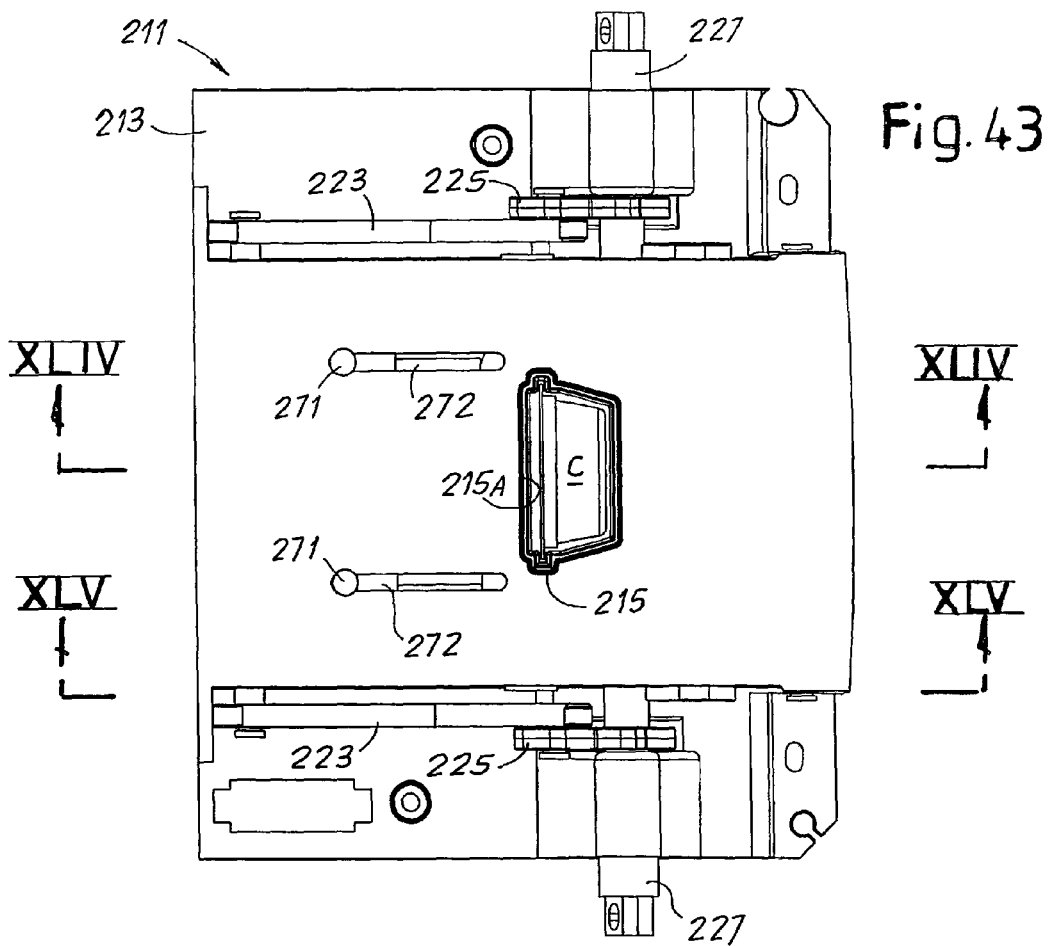
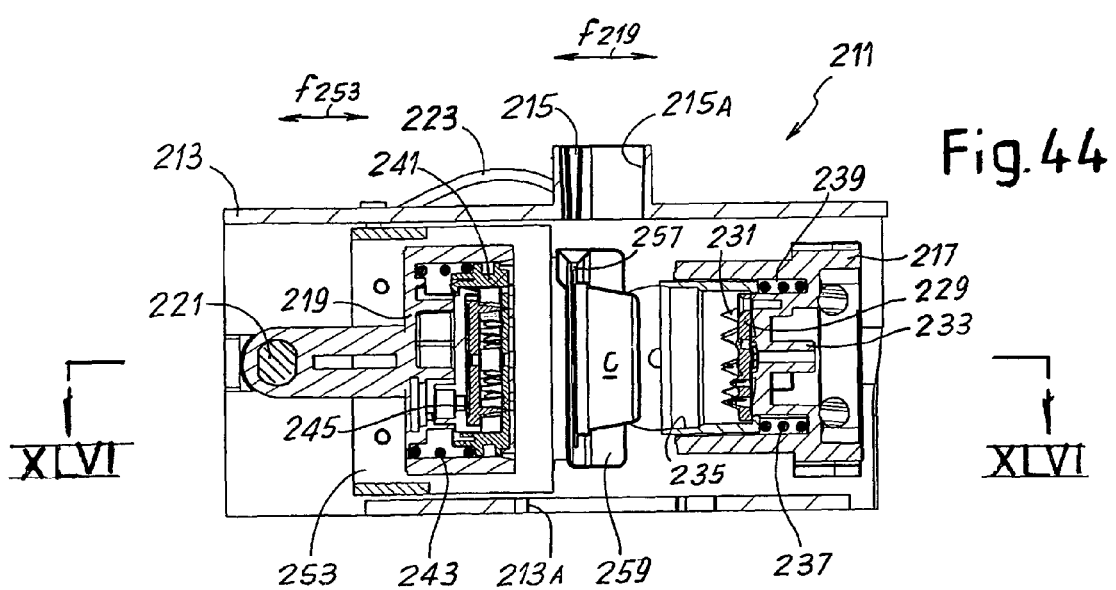

INFUSION DEVICE FOR COFFEE MACHINES AND THE LIKE

TECHNICAL FIELD

The present invention relates to improvements for the infusion devices for preparing a food product, in particular, but not exclusively, starting from single serving capsules.

STATE OF THE ART

For preparing coffee-based beverages, in particular espresso coffee or the like, machines are increasingly used, which use single serving capsules of coffee powder or other ingredients, by means of which the beverages are produced. These machines have considerable advantages, as the coffee powder is packaged in single doses and it can be therefore stored for a longer time without deteriorating, and furthermore the use of the machine is healthier, as the dispersion of the coffee powder outside the infusion chamber of the machine is prevented. Capsules for preparing beverages or other foods of different nature are also well known, for example for preparing drinking chocolate.

One of the critical aspects of the coffee machines, and in general of the machines for producing substantially liquid food products starting from single serving capsules, lies in the system for managing the capsules, i.e. in the set of components and aggregates, by means of which the capsules are manipulated inside the machine in order to be positioned, inserted inside the infusion chamber and perforated, crossed by the water or other infusion liquid and lastly discharged from the infusion chamber.

WO-A-2008/014830 describes an infusion device for preparing a food product starting from single serving coffee capsules, comprising: an infusion chamber formed by a first portion and a second portion, which are movable with respect to each other along an opening and closing direction; a first duct for feeding an infusion liquid into said infusion chamber; a second duct for delivering the food product from the infusion chamber; a pair of oscillating arms, which are movable with respect to at least one of said first and second infusion chamber, along said opening and closing direction, and which are provided with guide channels forming retaining members in order to insert and hold a capsule in a space between the first and the second portion of the infusion chamber, when said infusion chamber is open, and to insert said capsule inside the infusion chamber; members for causing reciprocal divarication of the two arms and of the respective guide channels and the release of the capsule inside the infusion chamber; in one of said first and second portion of the infusion chamber, an ejector for ejecting the capsule from the infusion chamber when the infusion cycle is ended.

In this known infusion unit the oscillating arms are used in order both to hold the capsule in the intermediate position between the two portions of the infusion chamber and then insert it inside the infusion chamber, and to extract the capsule from the infusion chamber when the infusion cycle is ended.

WO-A-2008/096385 describes a similar system, wherein inside one of the two portions of the infusion chamber a centering element is further provided for centering the capsule, in order to improve the perforation and infusion phase.

WO-A-2008/004116 describes a system for managing the single serving capsules in a coffee machine, wherein the single capsules are held by locking means which release the capsule inside the infusion chamber. The extraction system for extracting the capsule from the infusion chamber is not described.

WO-A-2005/004683 describes a similar system for managing capsules in coffee machines or the like, wherein a pair of oscillating arms hold the capsule in front of the infusion chamber and release it when the infusion chamber is closed. EP1721553 describes a similar system.

SUMMARY OF THE INVENTION

The present invention relates to improvements to infusion devices of the type described above, and, more precisely, the present invention has the object of improving that parts of the infusion unit which are used during the phase of holding the capsule, inserting the capsule inside the infusion chamber and extracting the capsule from the infusion chamber when the infusion cycle is ended.

Substantially, in an infusion device of the type comprising support arms for supporting the capsule and inserting the capsule inside the infusion chamber, the invention provides for devices or members for temporary disabling the retaining members and the arms during the opening phase of the infusion chamber after the beverage has been prepared, in such a way so that the arms do not intervene in the phase of removal or extraction of the capsule from the infusion chamber, and thus they do not hinder the ejection capsule movement, obtained for example through an ejector arranged inside one of the two portions of the chamber.

Further advantageous characteristics and embodiments of the invention are indicated in the appended dependent claims and will be described in greater detail below with reference to some non-limiting embodiment of the invention.

BRIEF DESCRIPTION OF THE DRAWINGS

The present invention will be better understood by following the description and the accompanying drawing, which shows examples of non-limiting practical embodiments of the invention. More in particular, in the drawing:

FIG. 2 shows a plan view according to II-II of FIG. 3 of the device of the present invention in a first embodiment;

FIG. 3 shows a longitudinal cross section according to III-III of FIG. 2;

FIG. 4 shows a section according to IV-IV of FIG. 3;

FIG. 5 shows an enlargement of the detail V of FIG. 4;

FIG. 6 shows a view similar to that of FIG. 2 in a different position of the infusion unit;

FIG. 28 shows a section according to XXVIII-XXVIII of FIG. 27;

FIG. 29 shows a section according to XXIX-XXIX of FIGS. 27, 28 and 29;

FIG. 30 shows a plan view similar to that of FIG. 27 in a subsequent phase of the infusion cycle;

FIG. 43 shows a plan view of a further embodiment of the device according to the present invention;

FIGS. 44 and 45 show sections according to XLIV-XLIV and to XLV-XLV of FIG. 43;

DETAILED DESCRIPTION OF EMBODIMENTS OF THE INVENTION

Figure 1:
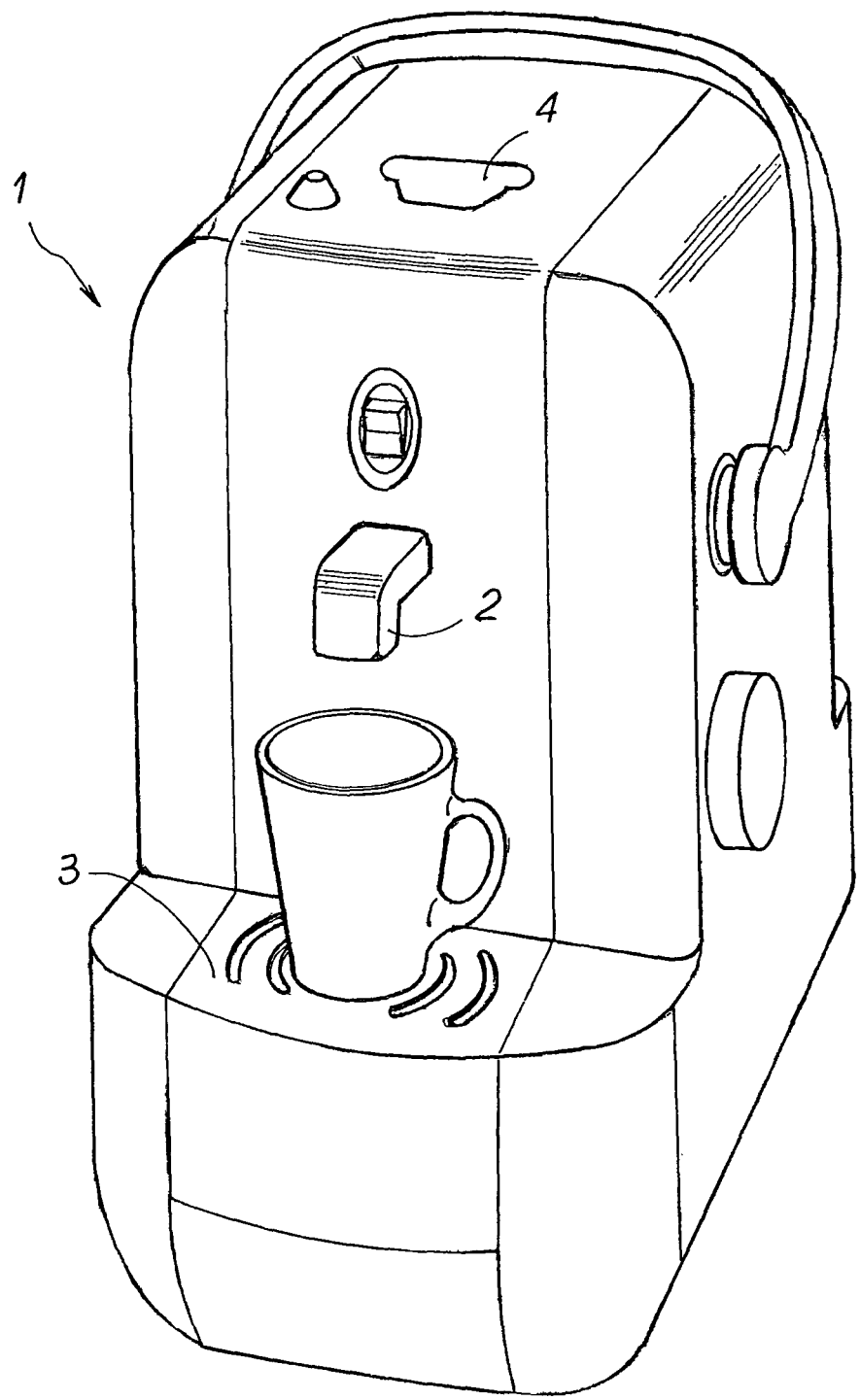
FIG. 1 shows an outer view of a coffee machine, in which the device according to the invention can be used.

FIG. 1 schematically shows an outer view of a coffee machine, in which the device according to the present invention, in one of the various embodiments described below, can be incorporated. The machine shown in FIG. 1 is provided purely by way of example, it being understood that the device according to the present invention can be incorporated in a coffee machine of even substantially different shape, and that similar devices can be used also in machines different from the coffee machines, for example for producing other types of foods starting from single serving capsules through infusion, i.e. by means of passage of a preferably pressurized hot liquid, typically water, through the single serving capsule, in which the ingredients for the production of the desired food product are inserted.

In FIG. 1 the machine is indicated as a whole with the number 1. It comprises one or more nozzles or spouts for dispensing the coffee, which are indicated with the number 2 and are arranged above a plane 3, onto which the cups or other containers suitable to collect the beverage delivered from the machine are placed. In the upper part, the machine presents an aperture for inserting the capsules, which is indicated with the number 4. The device of the present invention, which comprises the infusion chamber, is arranged below the aperture or slit 4. The device can be actuated manually, through a lever not shown, or by means of an actuator, for example an electric motor, not shown, housed inside the carter of the machine.

FIGS. 2 to 17 show in detail a first embodiment of the device according to the present invention in different positions during the dispensing cycle.

With initial reference to FIGS. 2 to 5, the infusion device, indicated as a whole with the number 11, comprises a frame or structure 13, mounted inside the machine 1 in a fixed manner. The frame presents a guide 15 in a hopper 15A, through which the single serving capsules C are inserted inside the infusion device. The device 11 is preferably arranged in such a way that the capsules C can be inserted (arrow F in FIG. 3) with a vertical fall movement inside the guide 15. The hopper 15A is arranged below the slit or aperture 4, in alignment with this latter.

Inside the structure or frame 13 an infusion chamber is provided, comprising a first portion 17 and a second portion 19. In some embodiments, the first portion 17 of the infusion chamber is preferably fixed with respect to the frame or structure 13 and therefore with respect to the machine 1, whilst the second portion 19 of the infusion chamber is movable with an opening and closing movement, schematically indicated with the double arrow f19 of FIG. 3. The opening and closing movement of the infusion chamber will be described in greater detail with reference to the sequence of FIGS. 3 to 17. It is also possible for the movement to be inverted, by positioning the portion 19 fixed and making the portion 17 movable. In other embodiments it is also possible to provide for both the portions to be movable with respect to the structure or frame 13.

The movable portion 19 of the infusion chamber is connected, by means of a secondary pivot pin 21 and a connecting rod-crank mechanism 25, to a pair of pivot pins 27 defining an axis of actuation. The rotation of the pivot pins 27 can be obtained manually through a lever or by means of an actuator, for example an electric motor, as previously mentioned. Through the connecting rod-crank mechanism 23, 25 the rotation of the pivot pins 27 causes the sliding of the movable portion 19 of the infusion chamber according to the double arrow f19.

As it can be seen in the FIGS. 3 and 4, inside the fixed portion 17 of the infusion chamber a plate 29 is arranged, provided with one or more perforators 31, which perforate the bottom of the single serving capsule C when the infusion chamber is closed. The plate 29 is perforated in such a way as to make coffee to pass from the capsule C towards a dispensing duct 33 for dispensing the beverage. The duct 33 is connected in a known manner to the dispensing nozzle or spouts 2 (FIG. 2).

Furthermore, inside the fixed portion 17 of the infusion chamber an ejecting element 35 is housed, which in the illustrated embodiment has the shape of a substantially cylindrical hollow body with an inner surface shaped so as to facilitate the insertion of the capsule C, of generally truncated conical shape, and to facilitate also the ejection and falling by gravity of the capsule in the manner described below.

The ejector 35 is at least partially slidingly housed in an annular seat 37 obtained in the portion 17 of the infusion chamber. A compression spring 39 is arranged inside the seat 37 to push toward the outside the ejector 25, which will be prevented from exiting from the portion 17 of the infusion chamber by means of suitable stop or limit members, not shown.

Inside the movable portion 19 of the infusion chamber a plate 41 is arranged, which rests on and presses against the upper surface of the capsule C. The plate 41 is slidable inside the movable portion 19 of the infusion chamber and can be pushed inside it against the force of a compression spring 43. Behind the plate 41, between its rear surface opposite to the surface which enters into contact with the capsule C and the inner wall of the movable portion 19 of the infusion chamber, a perforator 45 is arranged, which can be provided with one or more perforating tips. These tips penetrate inside the plate 41 through corresponding holes when the infusion chamber is closed, as it will be described in greater detail below, so as to obtain perforation of the upper surface of the capsule C.

In the movable portion 19 of the infusion chamber, pressurized hot water is fed through a duct schematically indicated with the number 47. The hot water penetrates through the perforator 45 and the plate 41, so as to flow through the capsule C and thus to cause the extraction of the flavors to produce the beverage which is delivered from the above mentioned duct 33.

To the movable portion 19 of the infusion chamber two arms 51 are associated, which partially follow the movement of the portion 19 of the infusion chamber. In some embodiments, the arms 51 have an elastic laminar structure, and can be constituted for example by a foil of a metallic material, for example a steel foil. They are fixed to a substantially rigid support 53 constrained to the secondary pivot pin 21 with such an arrangement as to allow a relative movement between the support 53 (and thus the arms 51) and the movable portion 19 of the infusion chamber according to the direction f19.

At this end, in a possible embodiment, the support 53 carries (see in particular also the enlargement of FIG. 5) a pair of permanent magnets 55. These magnets cooperate with the secondary pivot pin 21, which is advantageously made of ferromagnetic material. The secondary pivot pin 21 crosses the support 53 of the arms 51 in correspondence of a pair of guides or slots 53A provided in the support (see in particular the section of FIG. 7). With this arrangement, under normal conditions and without further stresses on the support 53, this latter is held by the magnets 55 in the position illustrated in FIGS. 3 and 4, i.e. with the secondary pivot pin 21 in abutment against the end of the two guides 53A further away from the fixed portion 17 of the infusion chamber. Vice versa, when on the support a counteracting force is exerted, the support itself slides with respect to the secondary pivot pin 21 so that the arms 51 move with respect to the movable portion 19 of the infusion chamber in the opening and closing direction f19. Instead of the magnets, the constraint between the support 53 of the arms 51 and the secondary pivot pin 21 can be formed by one or more traction or compression springs, arranged in a suitable manner to hold the support 53 in abutment against the pivot pin 21 in the arrangement of FIGS. 3, 7.

At the free end the elastic arms 51 are provided with guide channels 57 formed in terminal projections 59 integral with said elastic arms 51. The channels 57 form retaining means for the capsule, so that it can be inserted and held in a given position and then introduced in the infusion chamber, as it will be described in greater detail hereunder. When the infusion device is in opening position, as shown in FIGS. 2, 3, and 4, the channels 57 are arranged below the guide 15 obtained in the hopper 15A for inserting the capsule C, nearly aligned with said guide 15.

In this way, when a capsule C is inserted in the hopper 15A and is guided with its flange CF along the guide 15, it falls in the channels 57 and it is held in the position illustrated in FIGS. 3 and 4 in the space between the fixed and movable portions 17, 19 of the open infusion chamber. The capsule is held in this position due to the fact that the channels 57 are closed at the bottom and form an abutment for the flange CF.

The projections 59, in which the channels 57 of the two arms 51 are obtained, are each provided with a stem 61 which projects superiorly and inferiorly with respect to the corresponding projection 59. The two projecting ends 17 of each stem 61 engage in respective guides 63, which substantially form cam profiles for controlling the movements of the arms 51. The stems 61 are the followers of the cams formed by the profiles 63. As it can be seen in particular in FIGS. 2 and 5, each of the cam profiles formed by the guides 63 has two segments approximately parallel to the direction f19 of the opening and closing movement of the infusion chamber. These two segments of the guides are connected to each other through a connecting segment inclined with respect to the direction f19. The shape of the guides 63 is such that in the position of FIGS. 2 to 4 the arms 51 are held in a position close to the channels 57 at a distance nearly equal to the diameter of the flange CF of the capsule C, so that this latter is held by the channels in the position illustrated in FIGS. 3 and 4. Vice versa, when the projections 59 are in the farthest forward position toward the fixed portion of the infusion chamber, the stems 61 forming the followers of the cams constituted by the guides 63 are in the two reciprocally more distanced portions of the guides 63, so that the arms are forced in divaricated position in order not to interact with the capsule C, as it will be explained in greater detail hereunder.

The functioning of the device described above with reference to FIGS. 2 to 5 will be described in greater detail with reference to the sequence of FIGS. 3 to 17, which shows an entire cycle of infusion with different positions taken during the cycle by the members described above.

As above mentioned, FIGS. 3 and 4 show the position of the device in the initial phase of the infusion cycle, when the capsule C has been inserted through the hopper 15A in the space between the fixed 17 and the movable 19 portions of the infusion chamber. Here, the capsule is held by the arms 51 with the channels 57.

Figure 7:
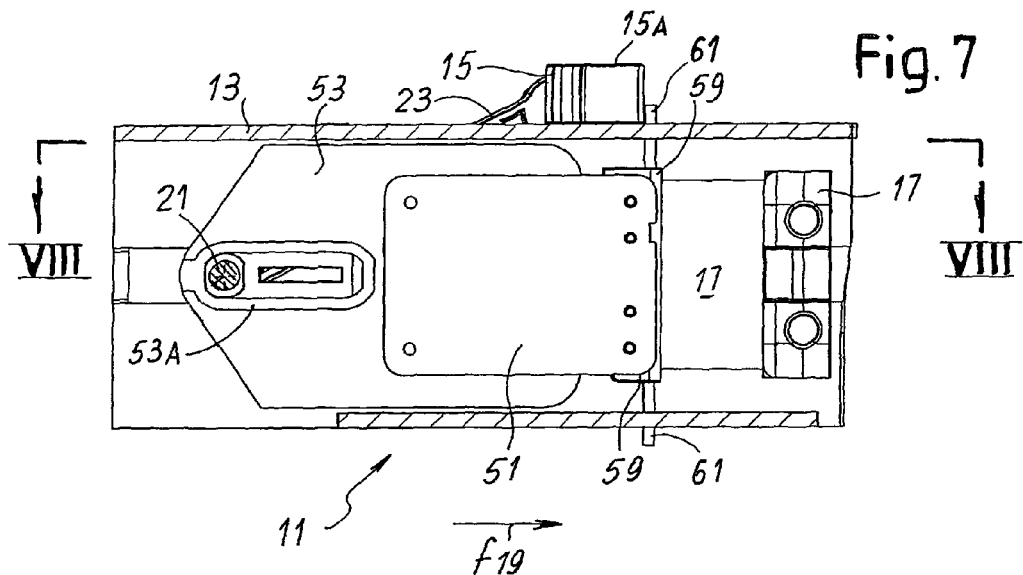
FIG. 7 shows a section according to VII-VII of FIG. 6.
Figure 8:
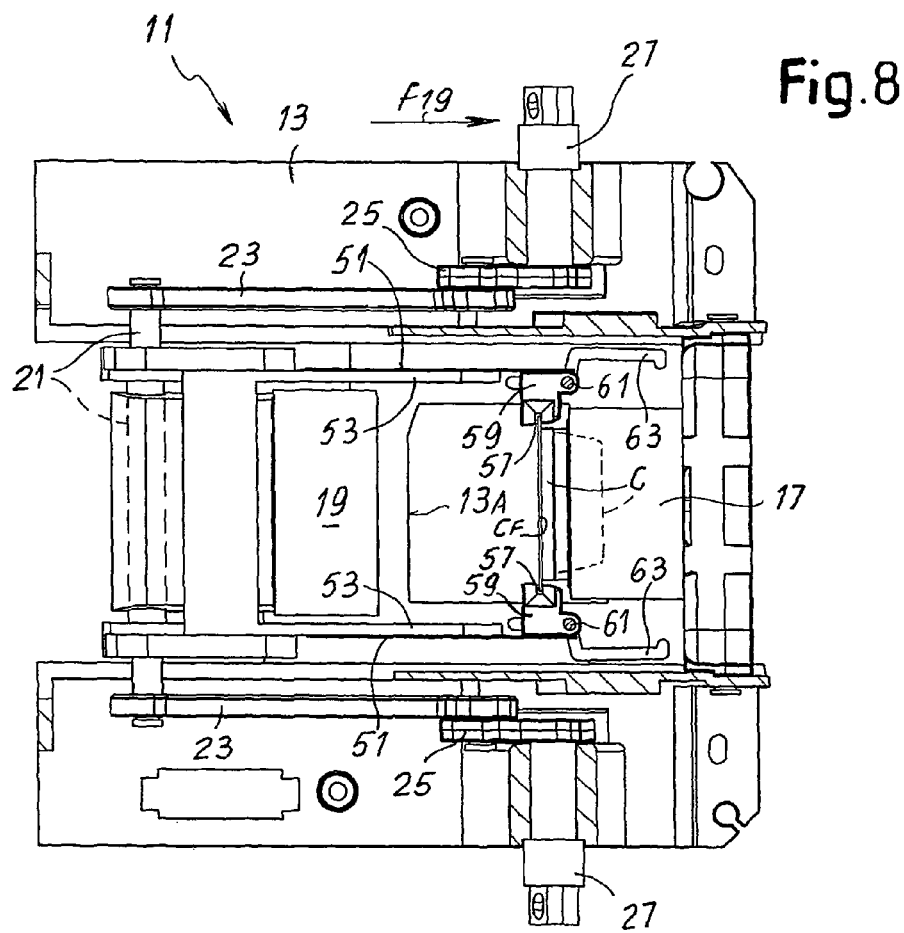
FIG. 8 shows a section according to VIII-VIII of FIG. 7.

By rotating the pivot pins 27, the connecting rod-crank mechanism 23, 25 causes the movement of the movable portion 19 of the infusion chamber towards the fixed portion 17. In the first phase of the movement, the support 53 with the arms 51 and the channels 57 moves integrally with the movable portion 19 of the infusion chamber. FIGS. 7 and 8 show the moment in which the capsule C is practically completely inserted inside the fixed portion 17 of the infusion chamber. The movement according to the arrow f19 also entails the thrust of the ejector 35 towards the inside of the fixed portion 17 of the infusion chamber. The movable portion 19 of the infusion chamber is still at a certain distance with respect to the fixed portion 17.

In the position illustrated in FIGS. 7 and 8, the ends of the stems 61 are at the end of the first segment of the respective guides 63 and they are going to start the run along the two divergent segments of the guides 63.

Figure 10:
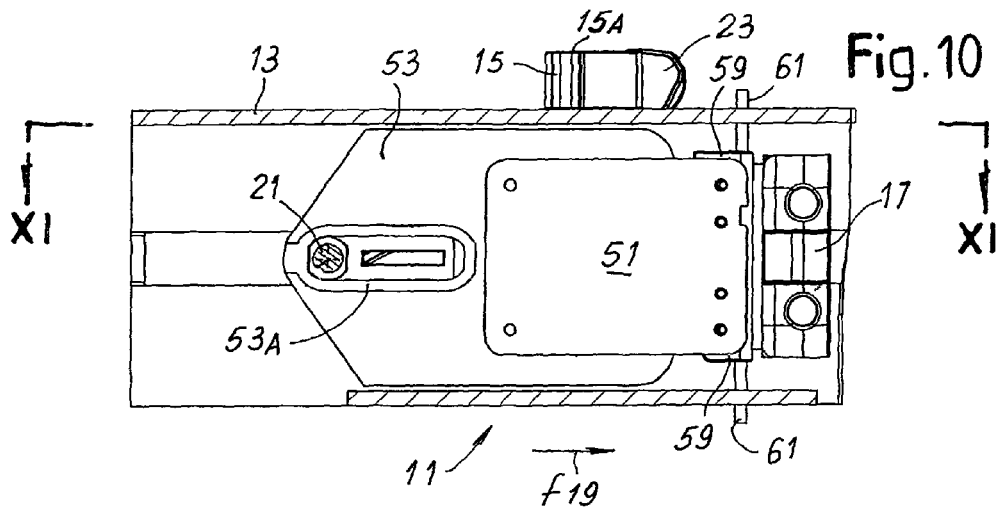
Figure 11:
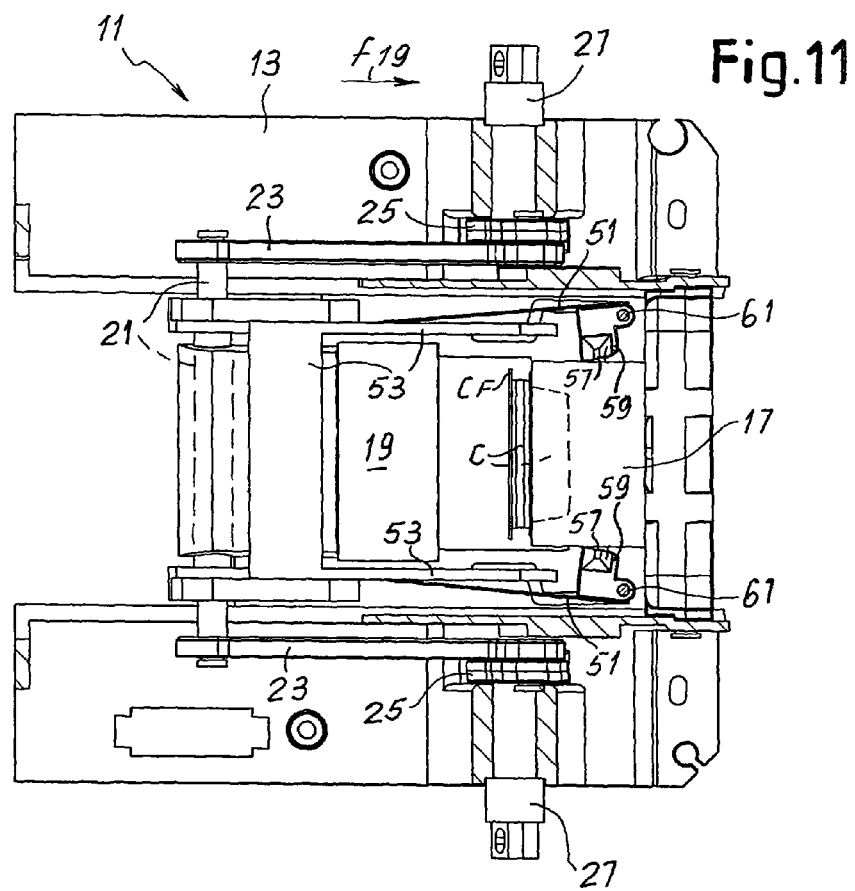

By continuing the closing movement of the infusion chamber with displacement of the movable portion 19 according to the arrow f19 toward the fixed position 17, the position of FIGS. 10 and 11 is achieved. The arms 51 have achieved their stop and maximum divarication position, and consequently they have released the capsule C, whose flange CF is no longer held by the channels 57. In other embodiments, the divarication of the arms 51 can be obtained through the effect of the interaction between the projections 59 and the fixed portion 17 of the infusion chamber, for example by providing surfaces inclined on one or on the other of the mentioned components. However, this divarication movement is preferably obtained through the cam profile formed by each of the guides 63, in which the stems 61 slide.

Figure 12:
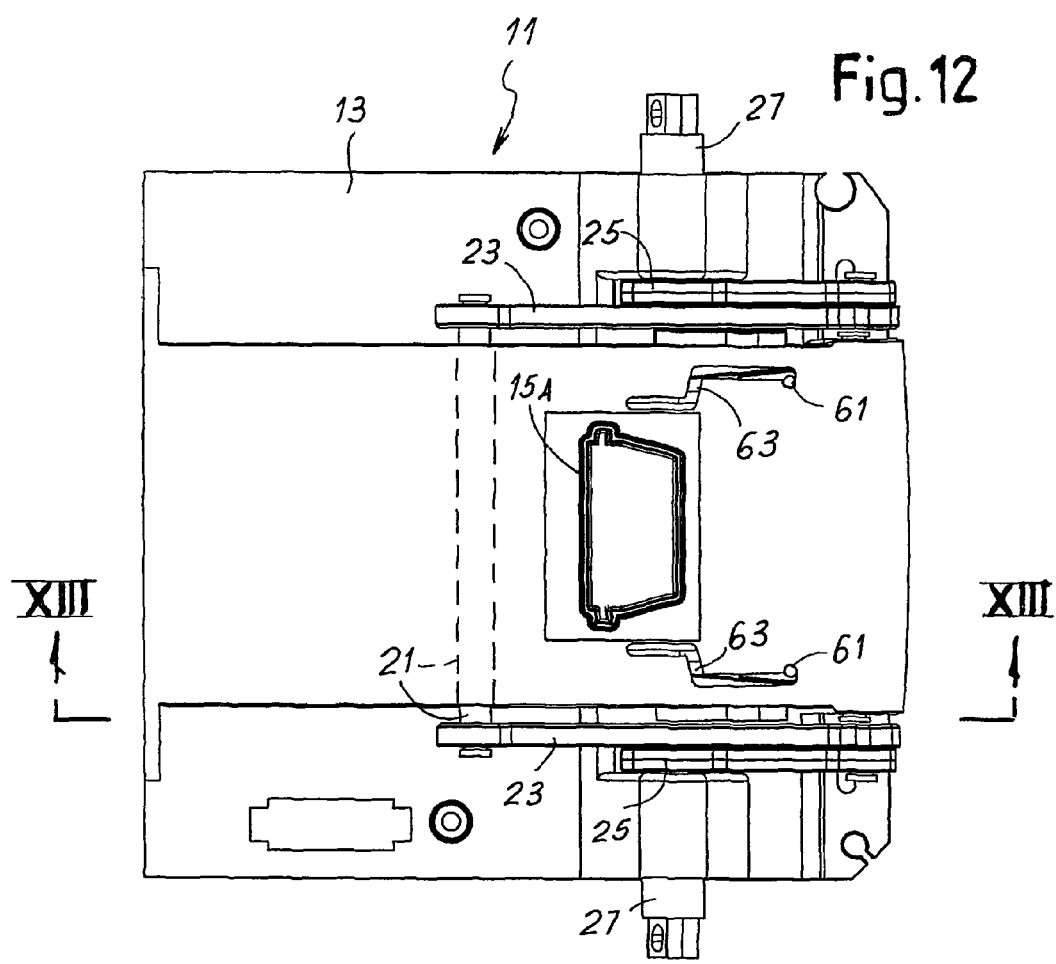
FIGS. 12, 13, and 14 again show further views similar to the previous ones, but in a subsequent position of the infusion unit.
Figure 13:
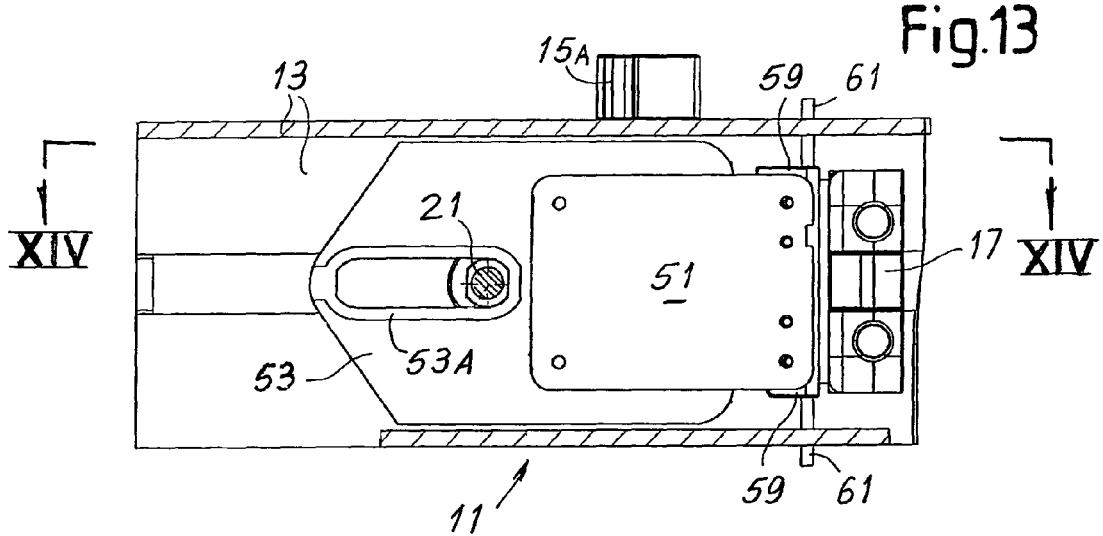
Figure 14:
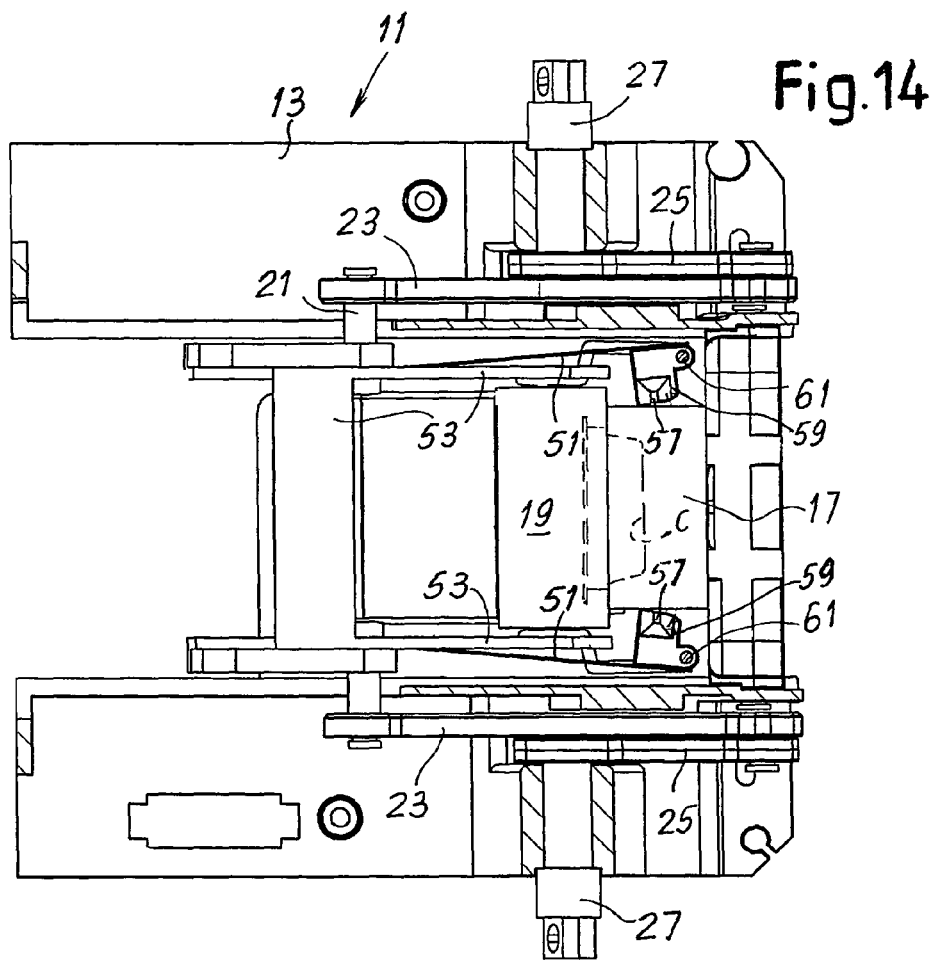

Although the arms 51 and the channels 57 do not provide a support anymore, the capsule C does not fall outside the fixed portion 17 of the infusion chamber, thanks to the fact that the closing movement of the device, and thus of the infusion chamber, is sufficiently fast, and therefore the device passes from the position of FIGS. 10 and 11 to the position of FIGS. 12, 13, and 14 in a very short time, insufficient for the accidental fall of the capsule C outside the infusion chamber.

In the position of FIGS. 12, 13, and 14, the infusion chamber is completely closed, with the perforated capsule C confined inside the infusion chamber formed by the mutually coupled portions 19, 17, through suitable gaskets on the flange CF of the capsule C and/or on the circular edges of the fixed and movable portions 17, 19 of the infusion chamber in a known manner.

Figure 9:
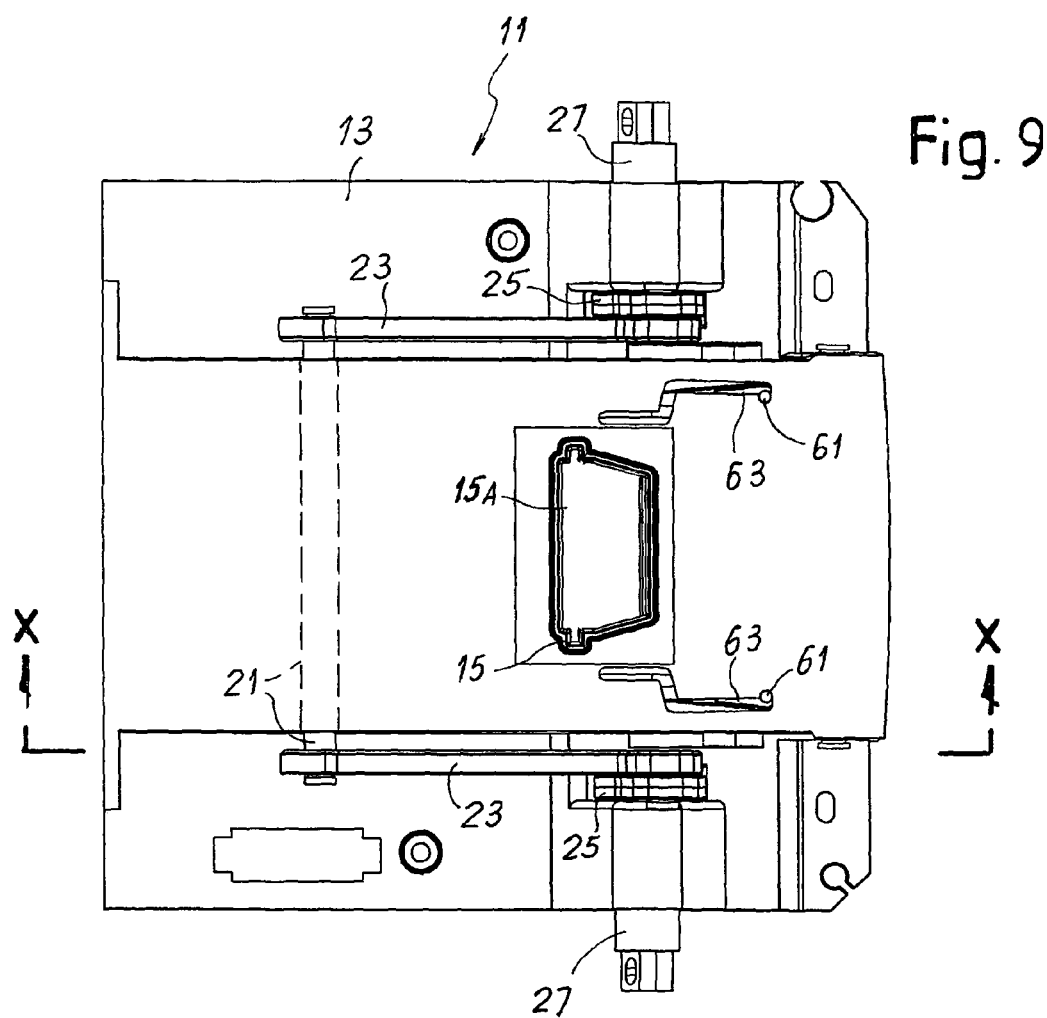
FIGS. 9, 10 and 11 show views similar to those of FIGS. 6, 7, and 8 in a further position of the infusion unit.

As can be seen by comparing FIGS. 9 to 11 with FIGS. 12 to 14, by changing from the arrangement of FIGS. 9 to 11, wherein the capsule C has been released in the fixed portion 17 of the infusion chamber, to the position of FIGS. 12 to 14, wherein the infusion chamber is closed, the support 53 of the arms 51 has remained in the stop position taken in FIGS. 9 to 11, whilst the movable portion 19 of the infusion chamber has further moved along the closing direction f19 of the infusion chamber. This movement is possible thanks to the fact that the support 53 of the arms 51 is constrained in a reversible manner with the secondary pivot pin 21, to which the movable portion 19 of the infusion chamber is rigidly constrained. When the arms 51 are held against further movement along the direction f19 due to the effect of the achievement of the terminal end of the guides 63 by the pivot pins 61, the further thrust exerted by the pivot pins 27 and the connecting rod-crank mechanism 23, 25 on the secondary pivot pin 21 and on the movable portion 19 of the infusion chamber causes the release of the secondary pivot pin 21 from the permanent magnets 55 and thus the sliding of the pivot pin 21 along the guides 53A of the support 53 of the arms 51, so as to have a relative movement between the movable portion 19 of the infusion chamber (which continues going forwards towards the fixed portion 17) and the support 53 of the arms 51 (which remains fixed).

In the arrangement of FIGS. 12 to 14 the pressurized hot water is supplied through the infusion chamber and the capsule C in order to obtain the beverage, which is delivered through the duct 33.

Figure 15:
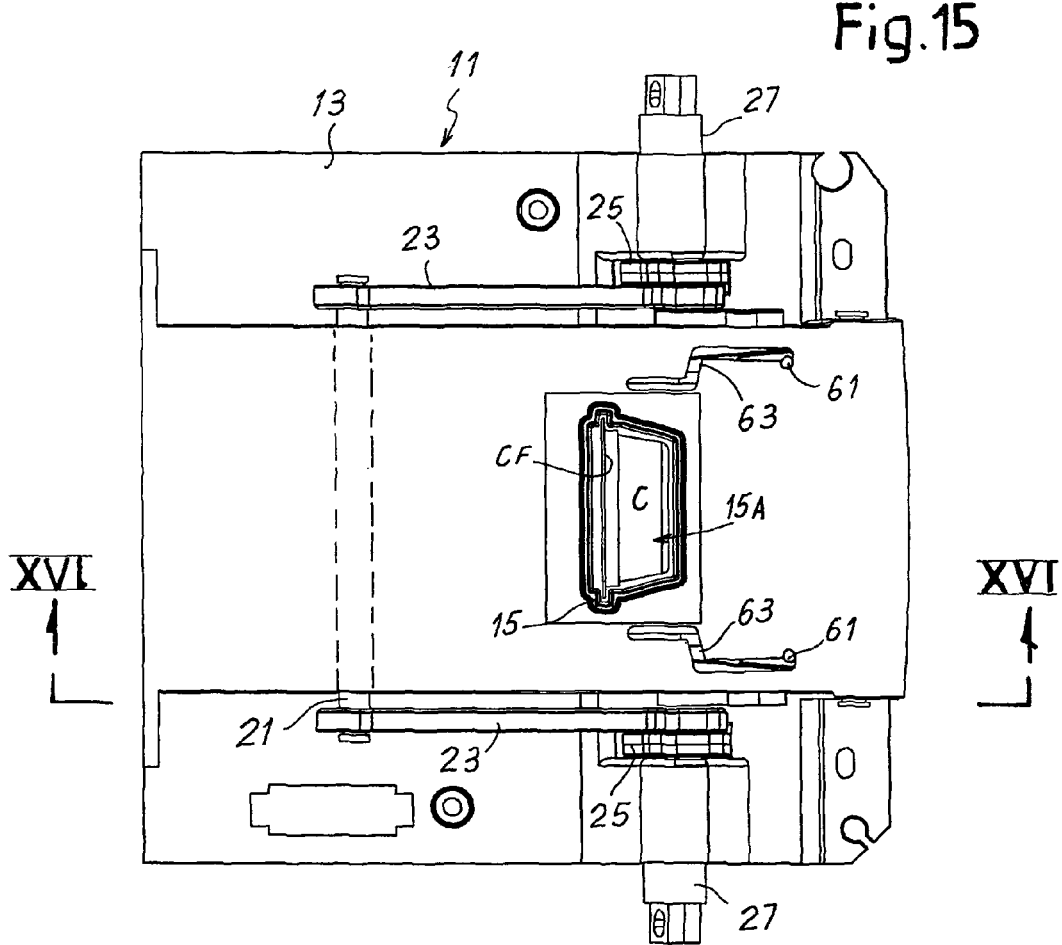
FIGS. 15, 16, and 17 show views similar to the previous ones with the device in the phase of ejecting the capsule after the infusion cycle.
Figure 16:
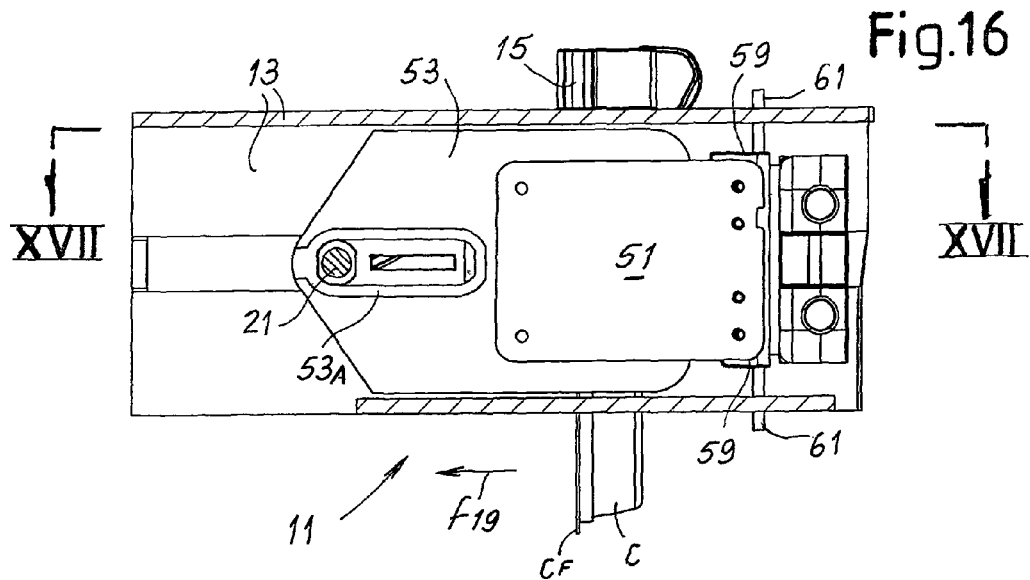
Figure 17:
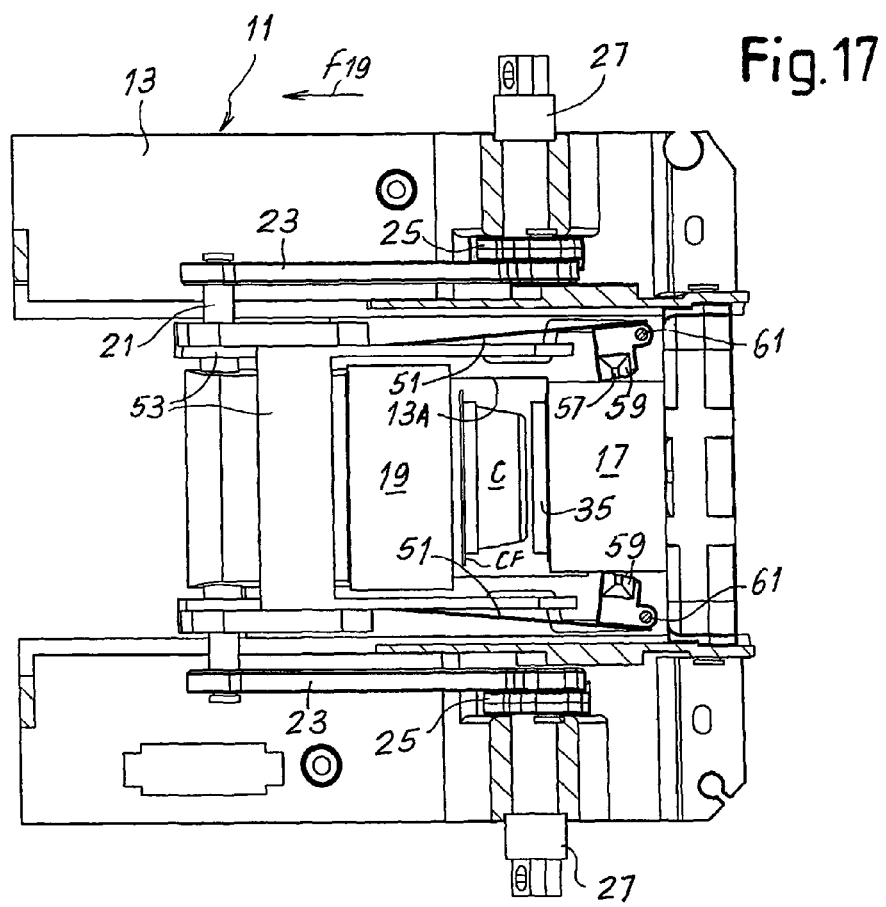

FIGS. 15 to 17 show the subsequent phase of opening the infusion chamber and discharging the exhausted capsule C. The capsule is ejected by the ejector 35 and falls through a lower aperture 13A in the support structure or frame 13.

In the position of FIGS. 15 to 17 the support 53 of the arms 51 has not been displaced: it remains held in the stop position achieved in FIGS. 9 to 11 until the capsule C is ejected by the ejector 35. This is possible due to the fact that, as described above, the support 53 of the arms 51 and the movable portion 19 of the infusion chamber can reciprocally move thanks to the sliding of the secondary pivot pin 21 in the guides 53A of the support 53.

Once the secondary pivot pin 21 is arrived to the end of the guide 53A as shown in FIGS. 16 and 17, the further opening movement (arrow f19 in FIGS. 16 and 17) causes the transfer of the support 53 by the pivot pin 21 towards the position of full opening (FIGS. 2 to 4). The support 53 is constrained again in a reversible manner to the secondary pivot pin 21 by means of the permanent magnets 55.

Therefore, with the arrangement described with reference to FIGS. 2 to 17, a particularly efficient management of the capsule C is obtained, separating the function of the arms 51 of holding the capsule C and inserting the capsule C in the infusion chamber from the function of ejecting the capsule from the infusion chamber when the delivery cycle is completed, thus avoiding interferences between the arms 51 and the capsule C in the ejecting phase of the used capsule C from the infusion chamber.

Figure 18:
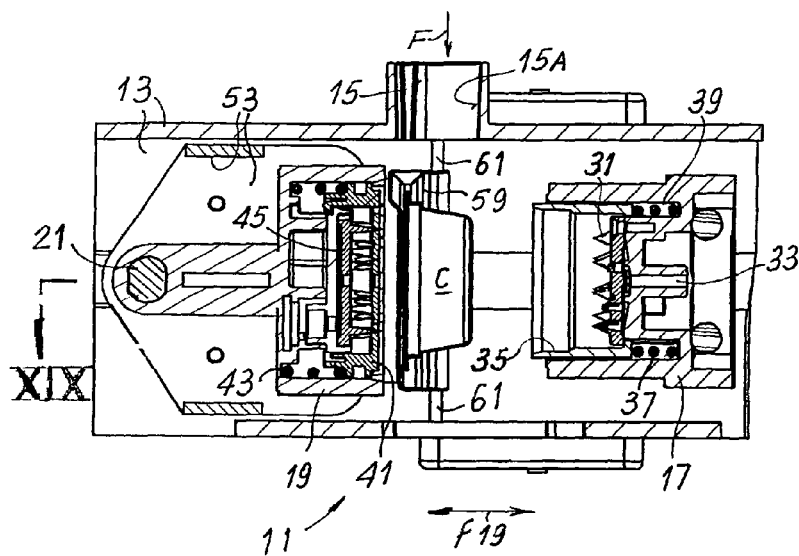
FIG. 18 shows a longitudinal cross section according to a substantially vertical plane of an infusion device in a further embodiment.
Figure 20:
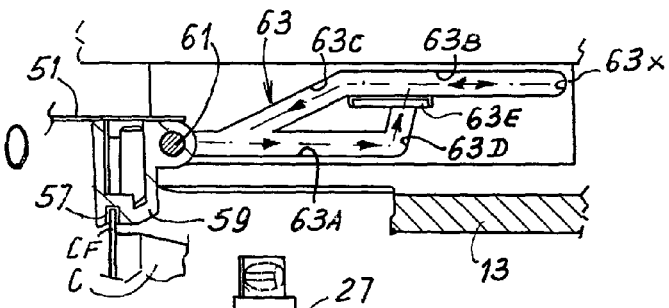
FIG. 20 shows a detail of the guide of one of the oscillating arms of FIG. 19.
Figure 19:
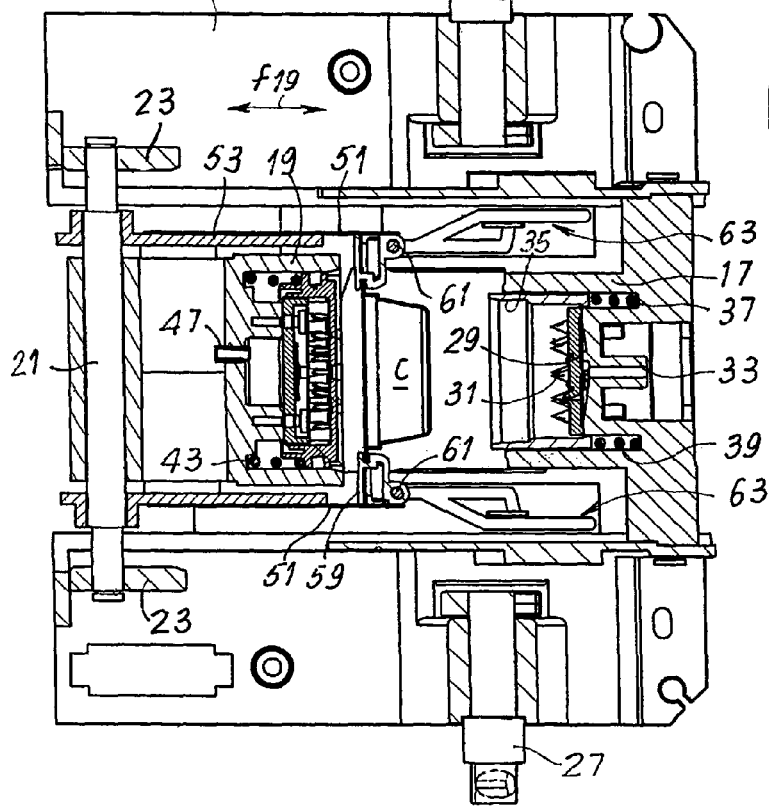
FIG. 19 shows a section according to XIX-XIX of FIG. 18.

A similar advantage is obtained with the arrangement of FIGS. 18 to 20, wherein the same or equivalent parts are indicated with the same reference numbers used in FIGS. 2 to 17. The embodiment of FIGS. 18 to 20 differs from the previous one in two respects: on one hand the support 53 of the elastic arms 51 is constrained to the movable portion 19 of the infusion chamber and it cannot be subjected to a relative movement with respect to it in the opening and closing direction f19 of the infusion chamber. Secondly, in order to obtain the advantage of the disengagement of the arms 51 and thus of the channels 57 and to avoid that they interfere with the capsule during the ejecting phase, the guides 63 forming the cam profiles for the stems 61 are designed with a different configuration, illustrated in detail in the enlargement of FIG. 20.

As it will be explained below, according to this configuration the stems 61 follow two different paths in the closing phase and in the opening phase of the infusion chamber, respectively. Consequently, the arms 51 will have different movements in the closing phase with respect to the opening phase of the chamber and, as in the previous case, they do not interfere in the ejection of the used capsule C from the infusion unit.

More in particular, with specific reference to FIG. 20, each stem 61 slides in a respective guide or cam 63, which has a first segment 63A, approximately parallel to the opening and closing direction f19 of the infusion chamber, a second segment 63B again approximately parallel to the opening and closing direction f19 but at a greater distance with respect to the centerline of the device, a convergent connecting segment 63C between the segment 63B and the segment 63A and a divergent segment between the segment 63A and the segment 63B. An elastic element 63E is further provided, for example a metallic thin sheet, between the segment 63D and the segment 63B.

In practice, during the closing movement of the infusion chamber, each stem 61 slides in the segment 63A of the guide 63 until it reaches the divergent segment 63D. By continuing the closing movement the stem 61 slides along the segment 63D and this causes the divarication of the arms 51 and therefore of the channels 75, with the consequent release of the capsule C inside the fixed portion 17 of the infusion chamber. By continuing the closing movement of the infusion chamber, the stems 61 achieve the segment 63D and travel along it until the terminal end 63X, which defines the closing point of the infusion chamber. Once the coffee has been dispensed, the infusion chamber opens with a movement of the movable portion 19 away from the fixed portion 17 and consequent sliding of the stems 61 along the segment 63D of the respective guide 63. The travel continues until the divergent connecting segment 63C, the elements 63E preventing the stems 61 from entering the segment 63D. By continuing the opening movement of the infusion chamber, the stems 61 slide along the convergent segments 63C and position themselves again in the portion of the segment 63A farthest from the fixed portion 17 of the infusion chamber, in the position illustrated in FIG. 20, which represents the position of the stem 61 and therefore of the arm 51 with respect to the guide 63 when the infusion device is fully open.

It is understood that in this way it is possible to hold the capsule C, to insert the capsule in the portion 17 of the infusion chamber by means of the arms 51 and channels 57, and subsequently to deactivate the channels 57 of the arms 51 in the phase of ejecting the capsule C, exactly as in the previous case, but without the need for a relative movement between the support 53 of the arms 51 and the movable portion 19 of the infusion chamber.

Figure 21:
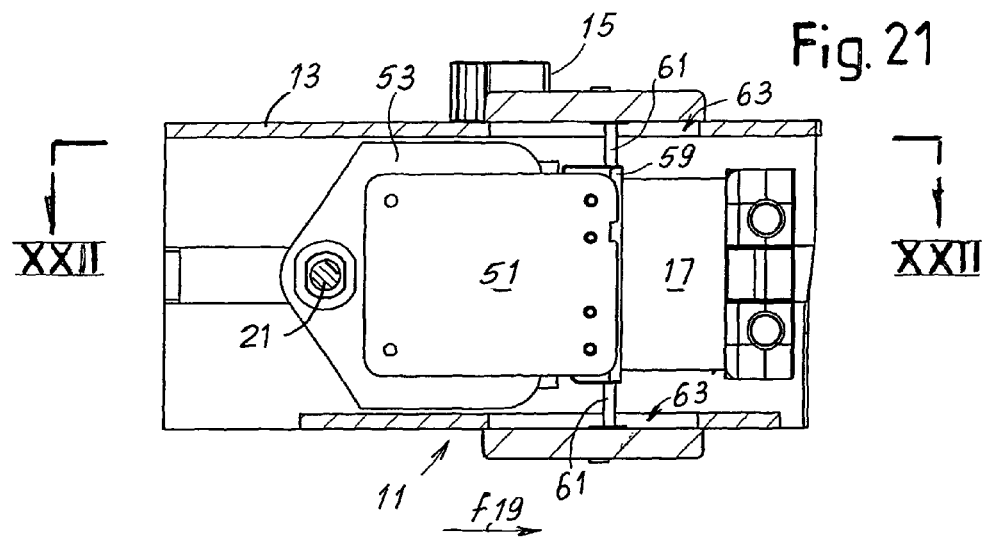
FIGS. 21 and 22 show sections similar to those of FIGS. 18 and 19 in a subsequent closing phase of the infusion chamber.
Figure 22:
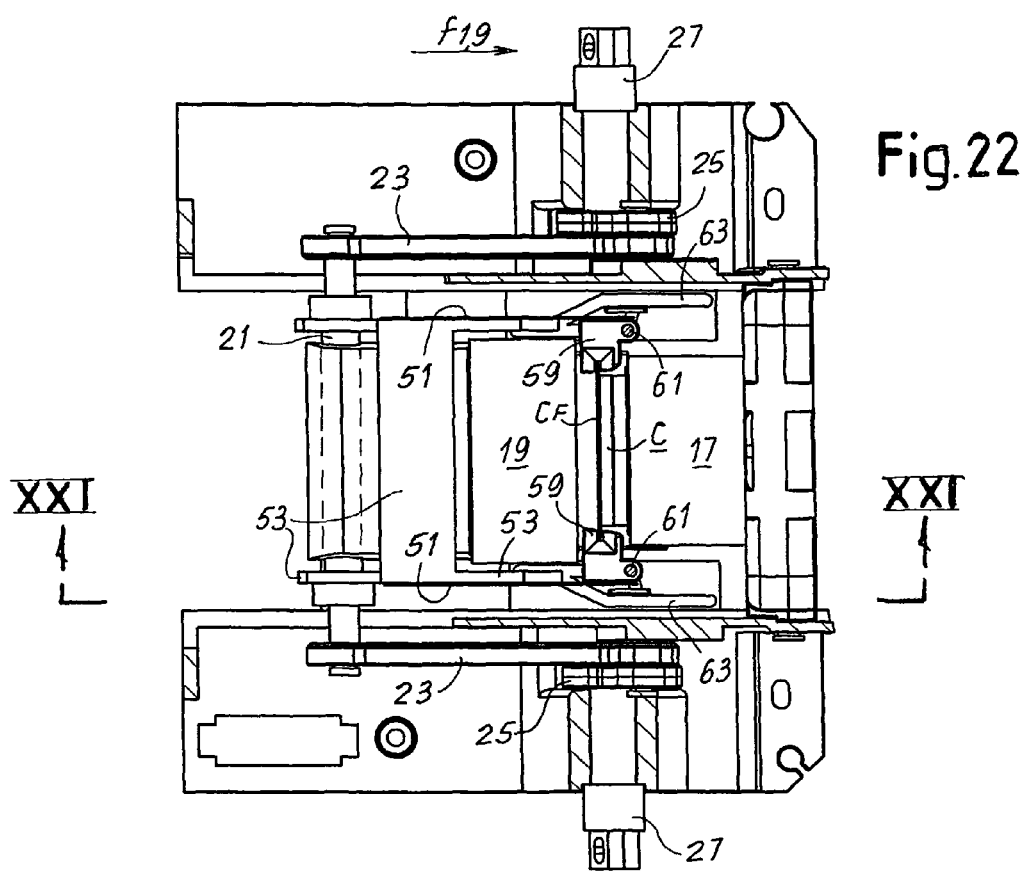
Figure 23:
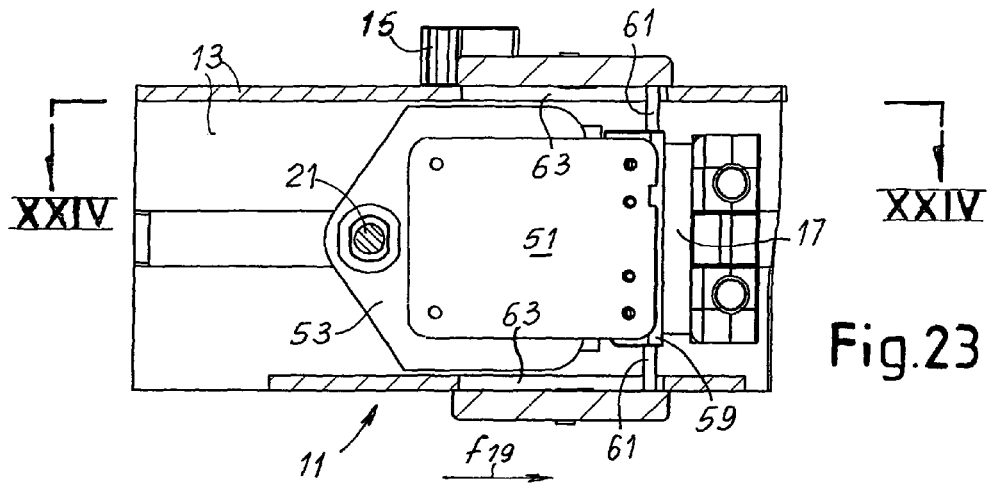
FIGS. 23 and 24 show views similar to those of FIGS. 21 and 22 in the position of full closure of the infusion chamber.
Figure 24:
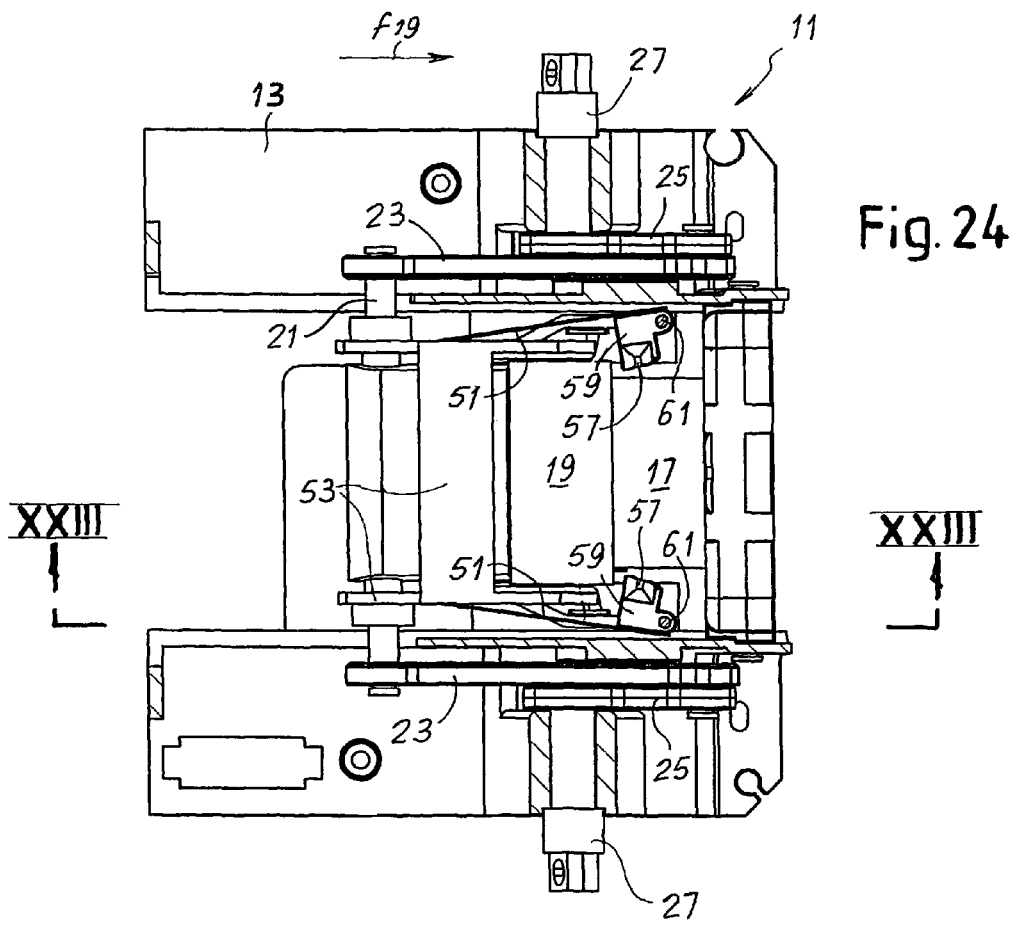
Figure 25:
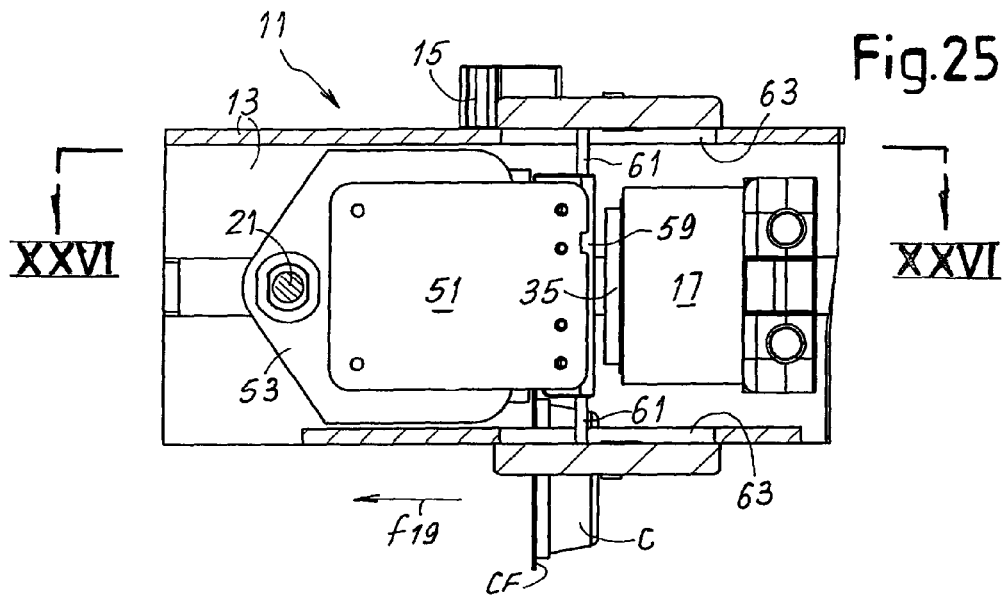
FIGS. 25 and 26 show views similar to those of FIGS. 23 and 24 in the phase of discharging the used capsule after the infusion cycle.
Figure 26:
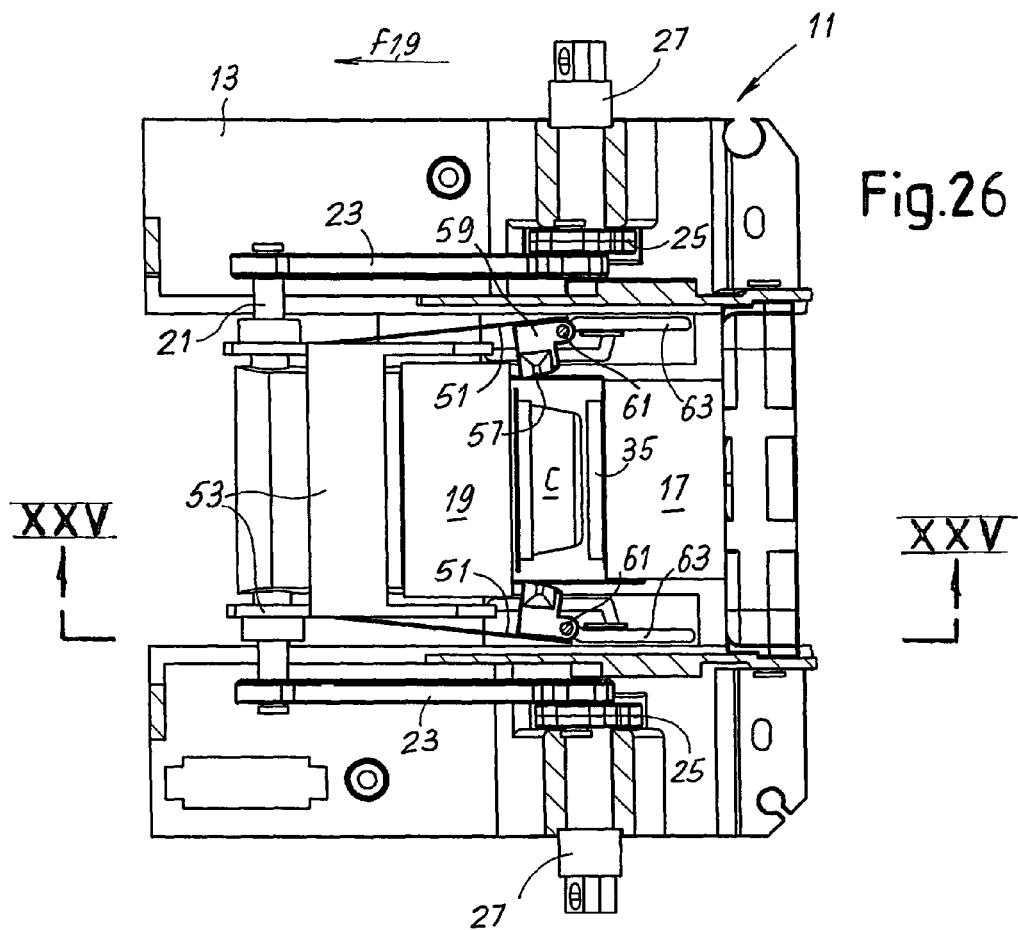

FIGS. 21 to 26 show the closing and opening movement of the device described with reference to FIGS. 18 to 20. More in particular, FIGS. 21, 23, 25 show sections along a substantially vertical plane according to XXI-XXI, XXIII-XXIII, XXV-XXV of FIGS. 22, 24, 26, whilst these latter show a section along a substantially horizontal plane according to XXII-XXII, XXIV-XXIV and XXVI-XXVI of FIGS. 21, 23 and 25 respectively. FIGS. 21 and 22 show the phase of insertion of the capsule C in the fixed portion 17 of the infusion chamber, FIGS. 23 and 24 show the position of maximum divarication of the arms and closure of the infusion chamber 17, 19, and FIGS. 25 and 26 show the discharging phase of the exhausted capsule.

FIGS. 27 to 40 show a further embodiment of the device according to the present invention during various phases of an infusion cycle. The same or equivalent parts to those of the previous embodiments are indicated with the same reference numbers increased by 100, and they will not be described again in detail, as reference may be done to the description above.

Figure 31:
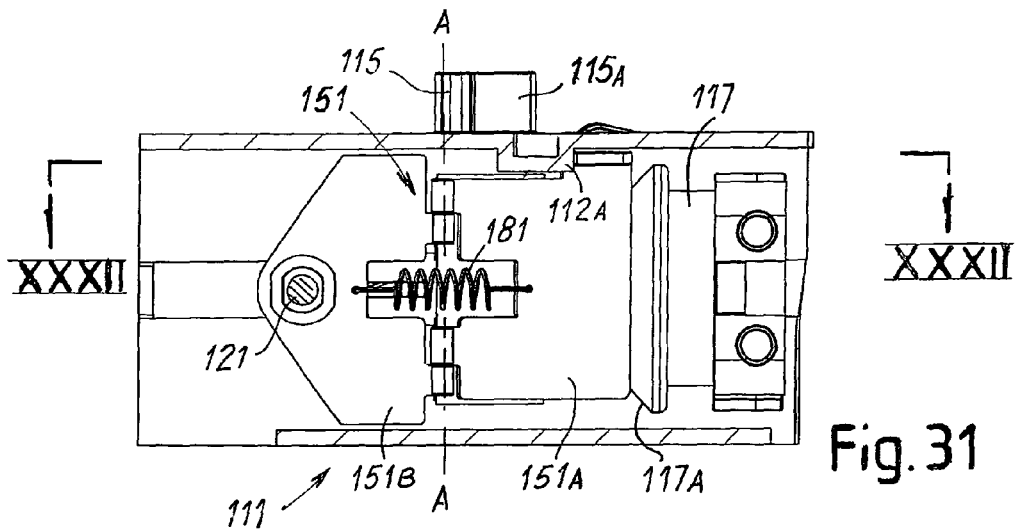
FIGS. 31 and 32 show cross sections according respectively to XXXI-XXXI of FIG. 30 and to XXXII-XXXII of FIG. 31.

In this embodiment, the arms, indicated with 151, are formed each in two portions 151A and 151B mutually articulated around respective substantially vertical axes A-A (FIG. 31). The mutually articulated portions 151A and 151B of each arm 151 are connected to each other through a traction spring 181, whose function is to define two balance position of the arms, as it will be described in greater detail hereunder.

The support 153 of the arms 151 is constrained to the secondary pivot pin 121 in a stable manner, i.e. the arms 151 move integrally with the movable portion 118 of the infusion chamber 117, 119, in a manner similar to that described above with reference to the embodiment of FIGS. 18 to 26.

The fixed portion 117 of the infusion chamber is externally provided with inclined surfaces 117A, which cooperate with similar inclined surfaces 159A of the projections 158 of the arms 151 for the purposes described below. Furthermore, the frame 113 has (see in particular FIGS. 31 and 38) inclined surfaces 112A cooperating with the arms 151.

Operation of the device in the embodiment of FIGS. 27 to 40 is as follows.

Figure 27:
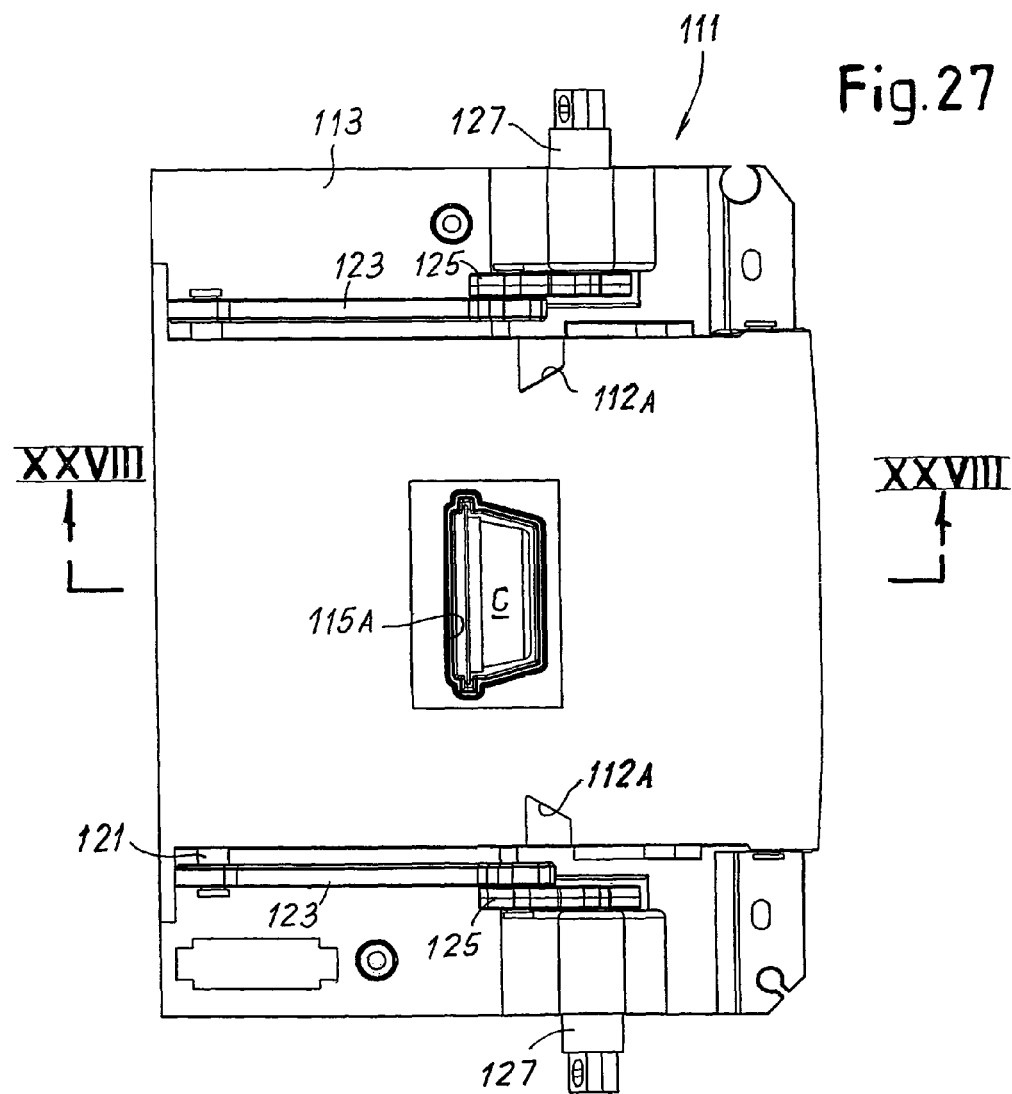
FIG. 27 shows a plan view of a further embodiment of an infusion device according to the present invention.

In FIGS. 27, 28, and 29 the device is in open position, with the movable portion 119 of the infusion chamber at the maximum distance from the fixed portion 117. Through the hopper 115A, the capsule C is inserted inside the channels 157 of the arms 151. These latter are close to each other in a stable balance position defined by the traction spring 181 and eventually by abutments provided on the frame 113 or on the portions 151A, 151B of the arms and not shown, which prevent an excessive approach of the oscillating portions 151A due to the effect of the traction exerted by the springs 181.

Figure 32:
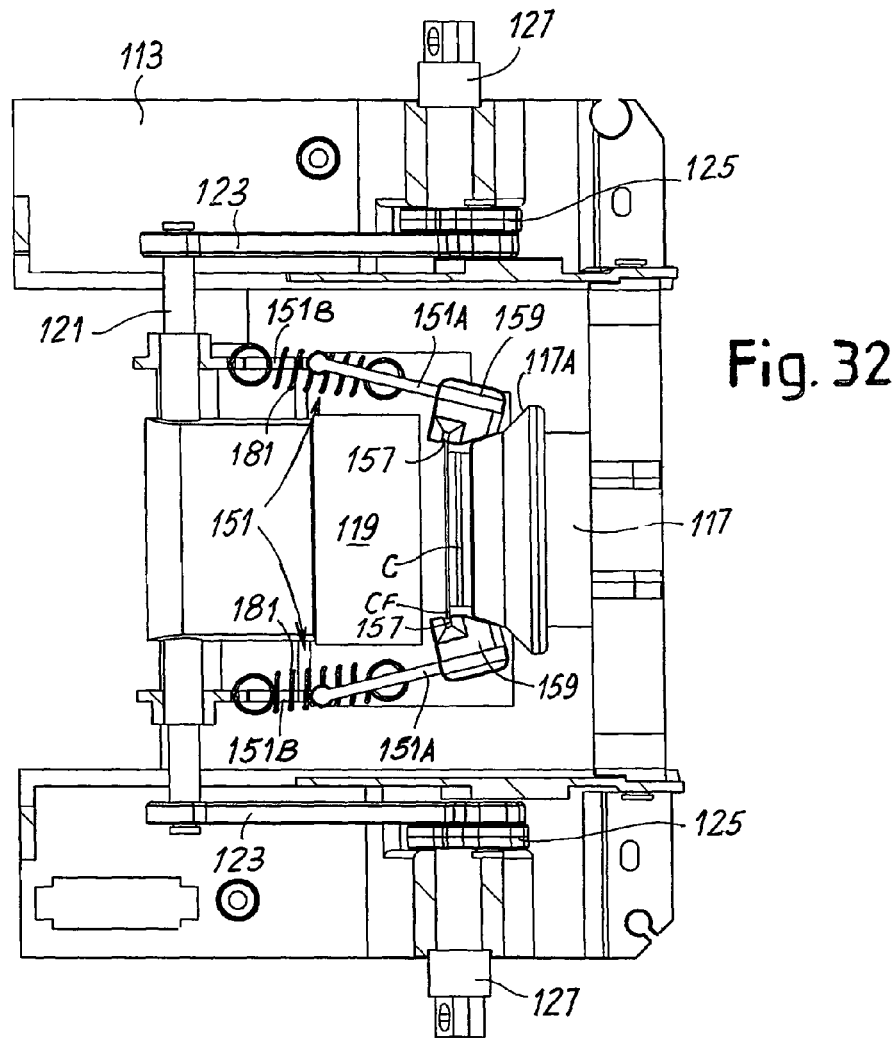

By starting the approaching movement between the movable portion 119 and the fixed portion 117 of the infusion chamber, the arms carry the capsule C inside the fixed portion 117 of the infusion chamber, as shown in FIGS. 31, 32. The ejector 135 is pressed inside the fixed portion 117 of the infusion chamber due to the thrust exerted by the capsule C.

The further closing movement of the device, with consequent further approaching movement of the movable portion 119 to the fixed portion 117 of the infusion chamber along the closing direction f19, causes the interaction between the inclined surfaces 159A of the arms 151 and the inclined surfaces 117A integral with the fixed portion 117. These latter can be formed, as shown in particular in FIG. 34, by a single conical surface formed on a collar of the fixed portion 117.

The transverse thrust exerted by the surface 117A on the surface 159A of each arm causes the elongation of the respective spring 181 and the oscillation, in the reciprocal divarication direction, of each oscillating portion 151A of the arms 151 with respect to the fixed portions 151B, said fixed portions 151 being integral with and rigidly coupled to the support 153.

Figure 33:
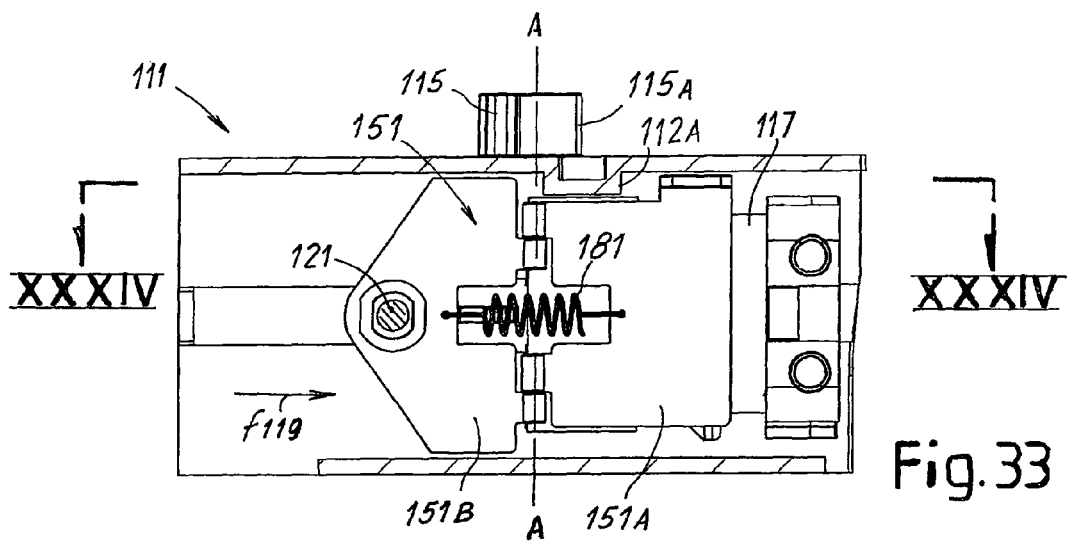
FIGS. 33 and 34 show sections similar to those of FIGS. 31 and 32 in a subsequent position of the device.
Figure 34:
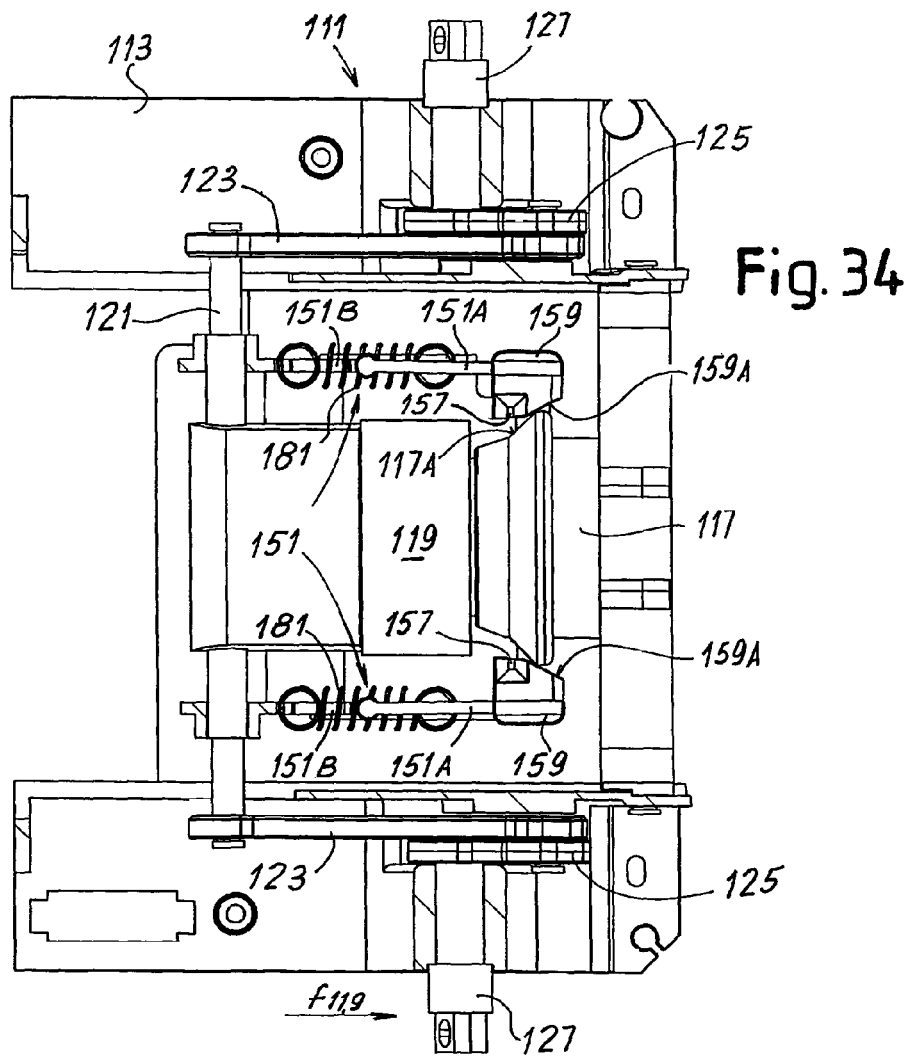

FIGS. 33 and 34 show an intermediate phase, wherein the arms 151 or more precisely their movable portions 151A have started the divarication movement and released the capsule inside the infusion chamber.

Figure 35:
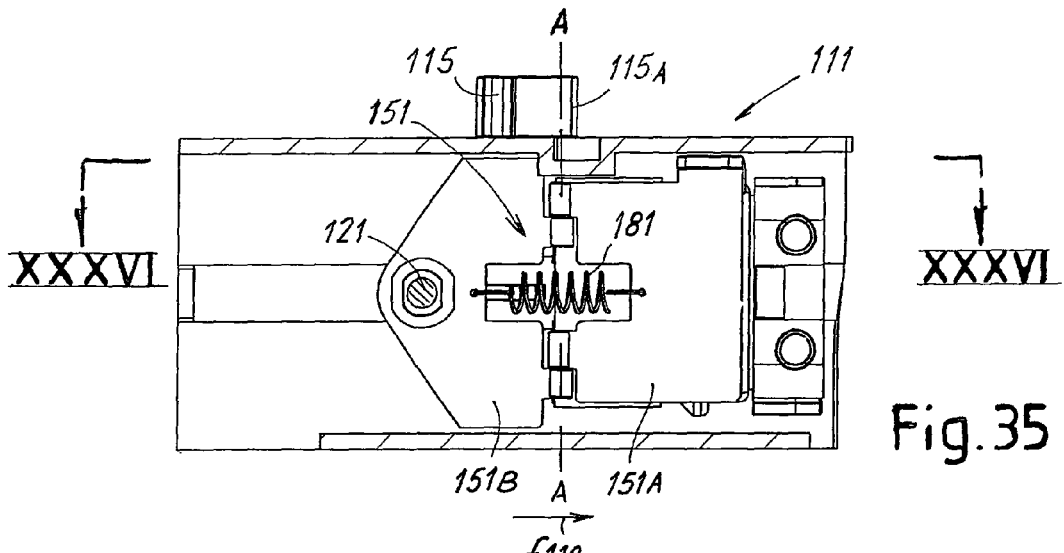
FIGS. 35 and 36 show sections similar to those of FIGS. 33 and 34 in a subsequent position of the device.
Figure 36:
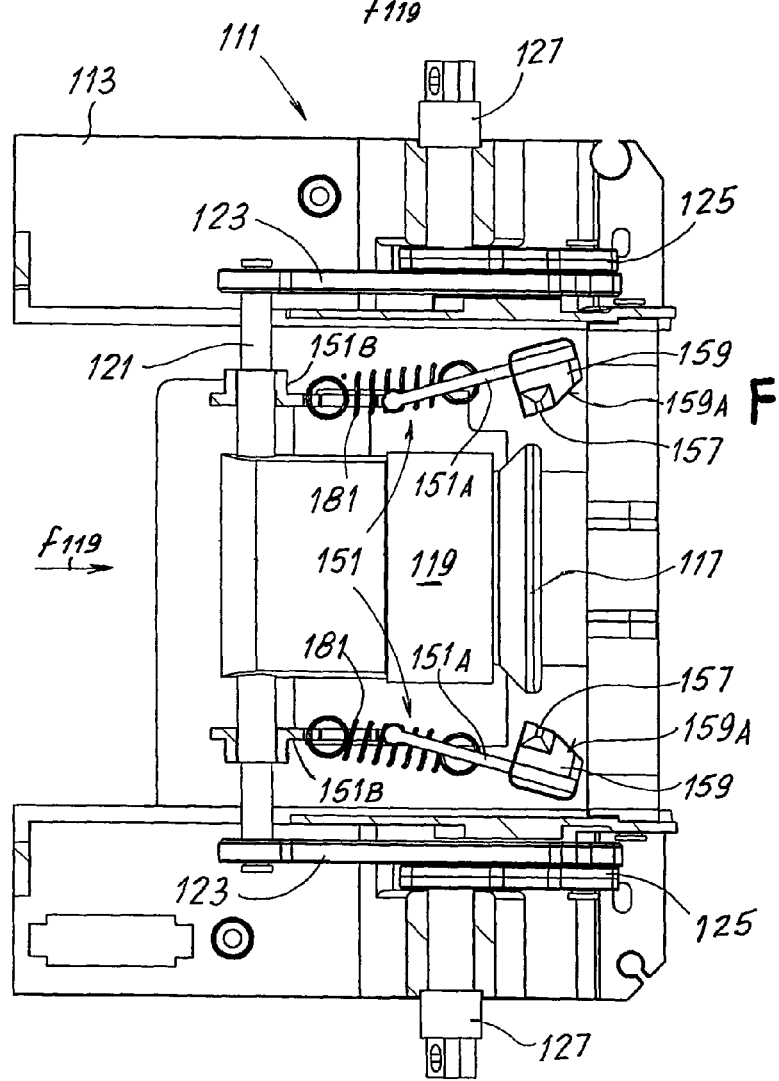

FIGS. 35 and 36 show the device in the position of full closure of the infusion chamber. The arms 151 achieved their second stable balance position defined by the springs 181. This is a position of maximum divarication of the arms.

Figure 37:
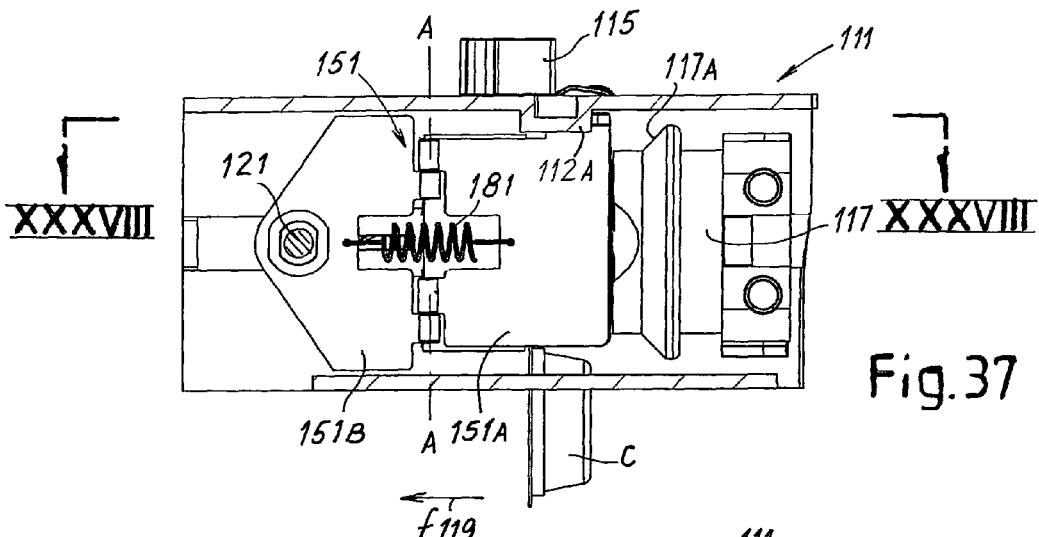
FIGS. 37 and 38 show sections similar to those of FIGS. 35 and 36 in the position of discharging the used capsule.
Figure 38:
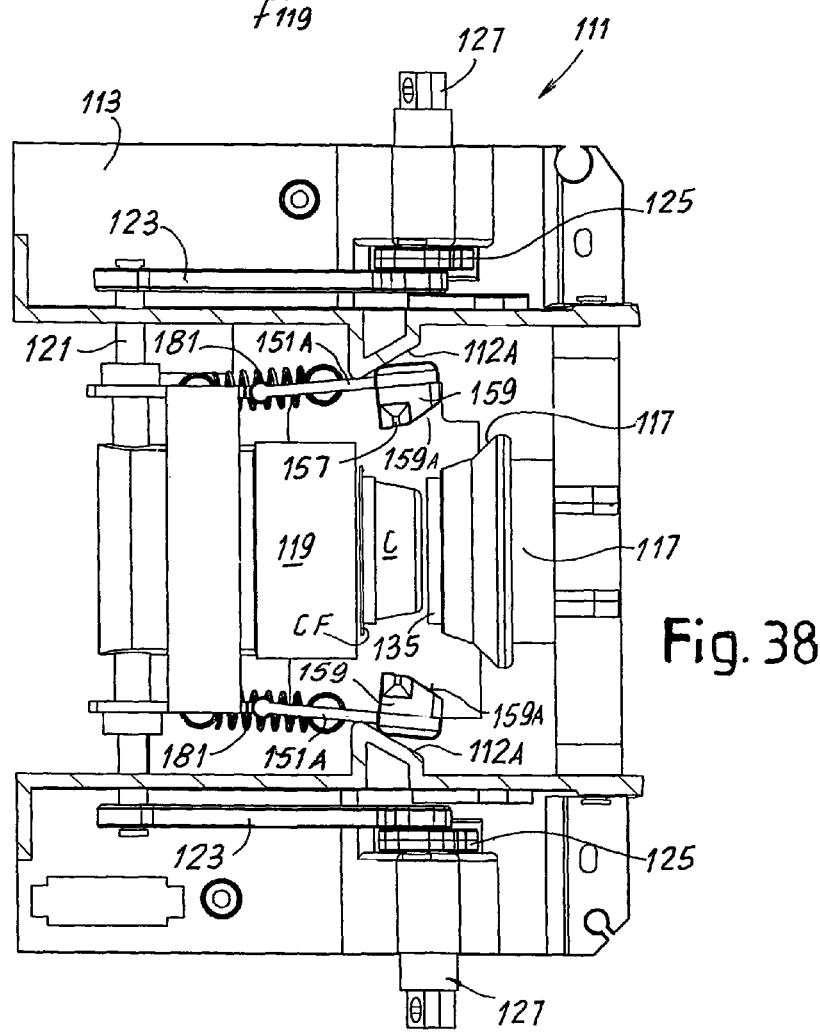

When the opening movement of the infusion chamber starts, once the beverage has been completely dispensed, the arms 151, or more exactly their oscillating portions 151A, remain in a divaricated arrangement for a first segment of the stroke for opening the infusion chamber, without interfering with the capsule C, which is therefore ejected from the fixed portion 117 of the infusion chamber by means of the ejector 135. FIGS. 37 and 38 show the phase of ejecting the capsule and of initial setting the arms 151.

This setting operation, i.e. the operation of changing from the stable balance position of FIGS. 35 and 36 to the stable balance position of FIGS. 28 and 29, is obtained thanks to the interaction between the oscillating portions 151A of the arms 151 and the fixed inclined surfaces 112A obtained on the frame 113.

Figure 39:
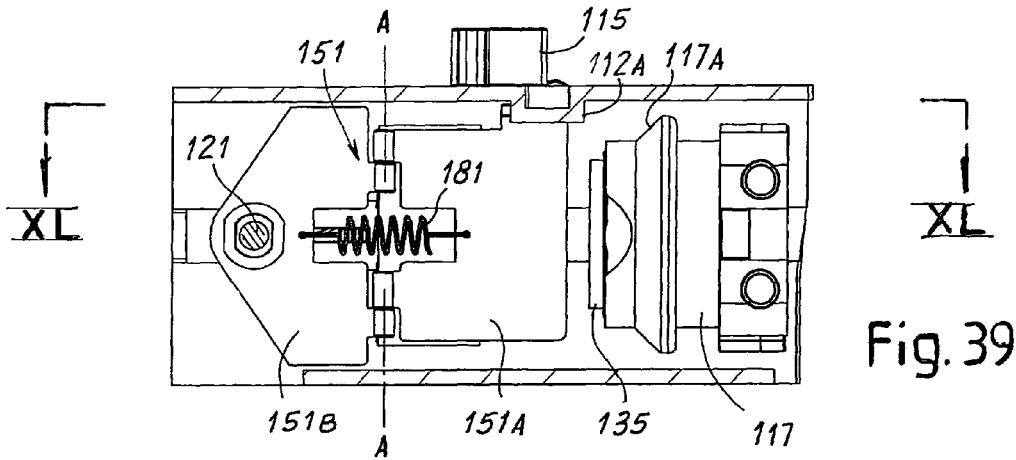
FIGS. 39 and 40 show sections similar to those of FIGS. 37 and 38 in a further subsequent position of the device.
Figure 40:
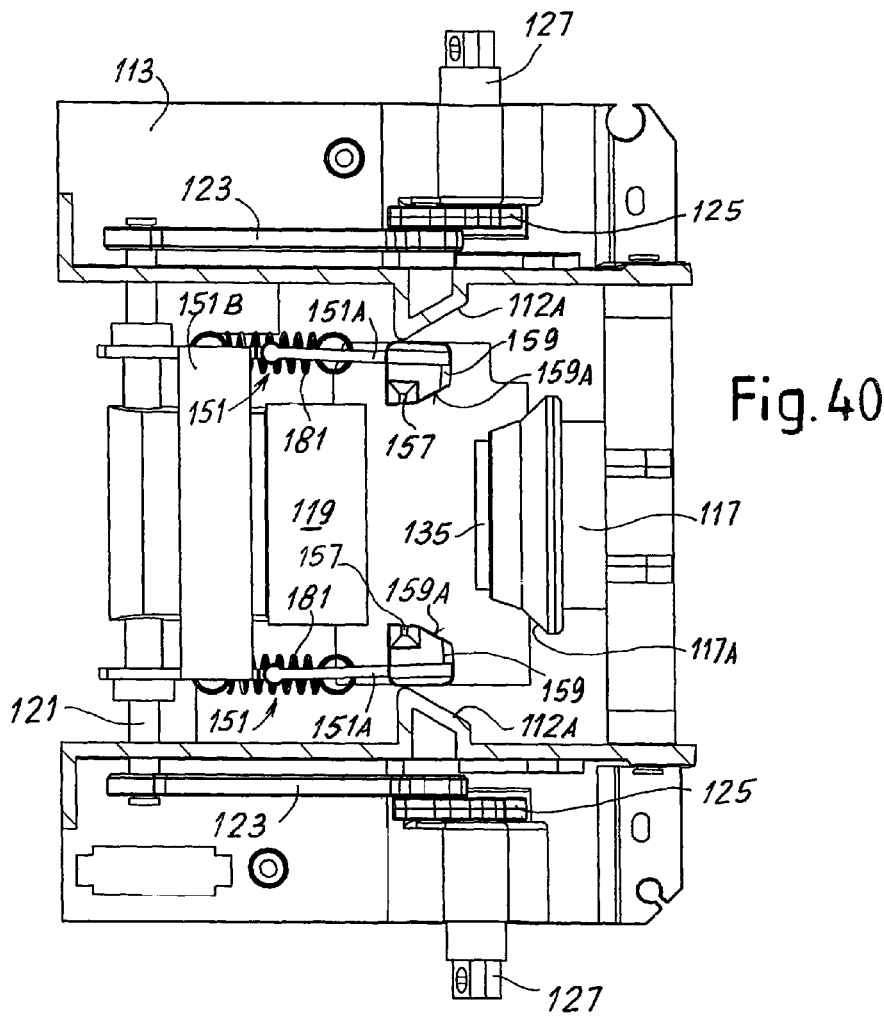

FIGS. 39 and 40 show the instant when the arms achieve an oscillation position, beyond which the traction exerted by the spring 181 causes the setting of the arms, i.e. their snap passage in the stable balance position of FIGS. 28 and 29, position in which the arms are ready to receive and hold a new capsule C in position.

Figure 41:
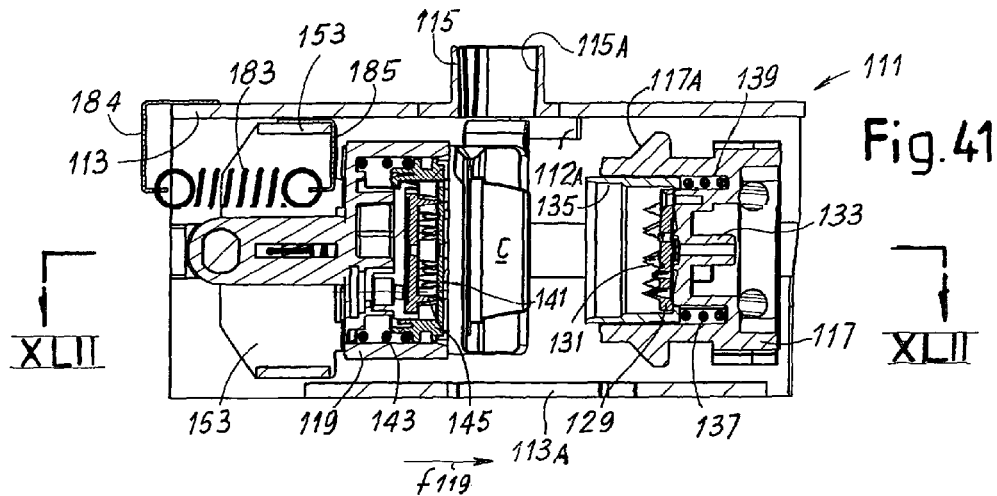
FIGS. 41 and 42 show sections similar to those of FIGS. 28 and 29 in a variant of embodiment.
Figure 42:
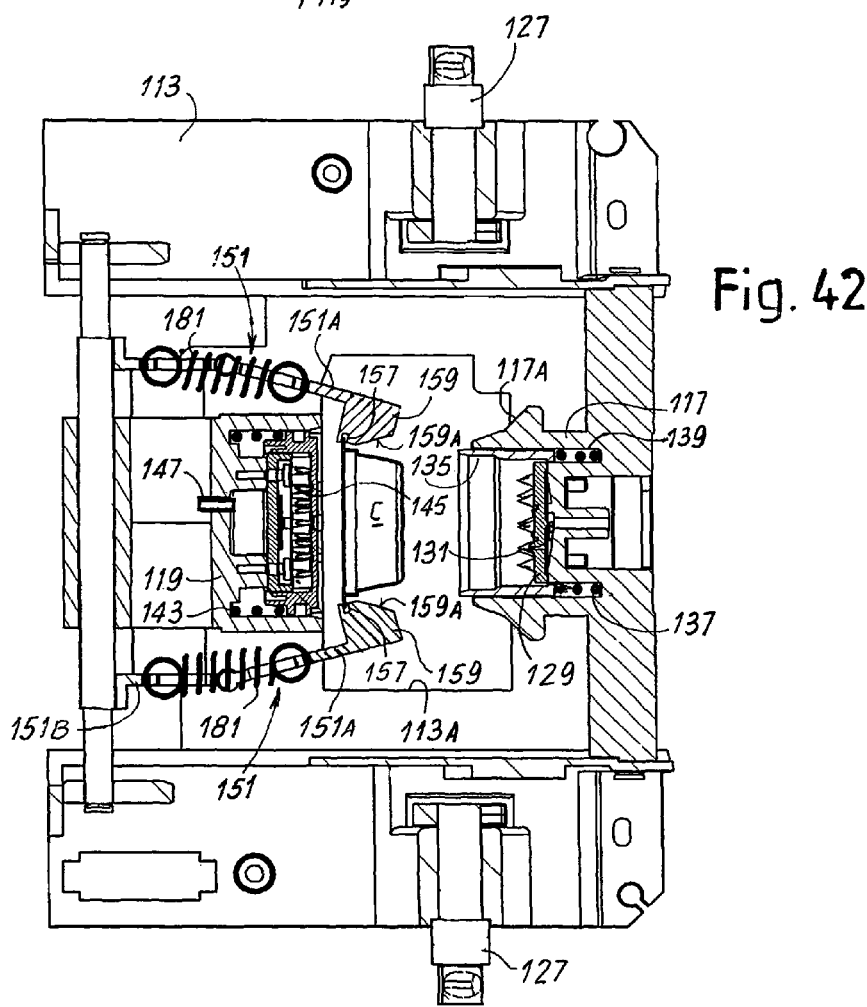

FIGS. 41 and 42 show a modified embodiment of the device of FIGS. 28 to 40, where identical or equivalent parts to those of the previous embodiment are indicated with the same reference numbers. The differences between the embodiment of FIGS. 28 to 40 and the embodiment of FIGS. 41 and 42 is the presence of a return spring 183 constrained through a first bracket 184 to the frame 113 and through a second bracket 185 to the support 153 of the arms. In this case, the support 153 of the arms is not constrained to the pivot pin 121, but it is lifted in abutment against the pin by means of the traction or return spring 183. The support 153 is therefore carried forward under the effect of the thrust of the stem 121, whilst it returns back due to the effect of the traction of the spring 183.

Also in the embodiments of FIGS. 28 to 42, the advantage is obtained of excluding the effect of the arms 151 and of the channels 157 on the capsule C once this latter has been correctly inserted in the infusion chamber. The ejection of the used capsule C occurs due to the effect of the ejector 135 without interfering with the arms 151.

FIGS. 43 to 54 show, in different phases of the infusion cycle, a further embodiment of the device according to the present invention. The same or equivalent parts to those of the embodiment illustrated in FIGS. 2 to 26 are indicated with the same reference numbers increased by 200.

In this embodiment the opening and closing movement (according to the arrow f219) of the movable portion 19 of the infusion chamber is controlled by a mechanism different from that controlling the movement of the arms 251 in the same direction of the opening and closing movement f219. Both the mechanisms receive motion from the pivot pins 227.

The opening and closing movement according to the arrow f219 of the movable portion 219 of the infusion chamber is obtained through a connecting rod-crank mechanism 223, 225 through the pivot pins 227 in a manner similar to that described with reference to the previous example of embodiment.

Vice versa, in this case the support 253 of the arms 251 forms a saddle provided with an autonomous movement with respect to the movable portion 219 of the infusion chamber. The support 253 is guided on the frame 213 in an adequate manner, for example through a pair of pivot pins 271 (see in particular FIG. 43) guided in guiding slots 272 obtained on the support structure or frame 213.

The movement according to the double arrow f253 (FIGS. 44, 45, and 46) of the support 253 of the arms 251 is controlled by means of the pivot pins 227 through a mechanism comprising a gear rack drive. The drive is double on the two sides of the device, a kinematic chain being provided for each of the two pivot pins 227. The two kinematic chains are mutually specular, and therefore only one of them will be described. On each pivot pin 217 a gear wheel or pinion 281 is keyed, which engages with a second gear wheel or pinion 283 keyed on a shaft 285 supported by the respective side 213B of the frame 213. On the shaft 285 is also keyed a third gear wheel or pinion 287, which has a partial toothing, i.e. a toothing developed according to an arc of a circle limited to a fraction of the round angle. The toothing of the partial gear wheel 287 engages with a respective rack 289 integral with the support 253.

With this arrangement the rotation of the pivot pins causes:
the opening and closing movement of the infusion chamber under control of the mechanism of the crank 223, 225 according to the arrow f219
the translation movement according to a direction f253 (parallel to the opening and closing direction f219 of the infusion chamber) of the support 253 and thus of the arms 251 with the respective channels 257, movement obtained by the drive 281, 283, 287, and 289.

Operation of the device disclosed above with reference to FIGS. 43 to 46 will be described in detail with reference to the whole sequence of FIGS. 44 to 54.

Figure 45:
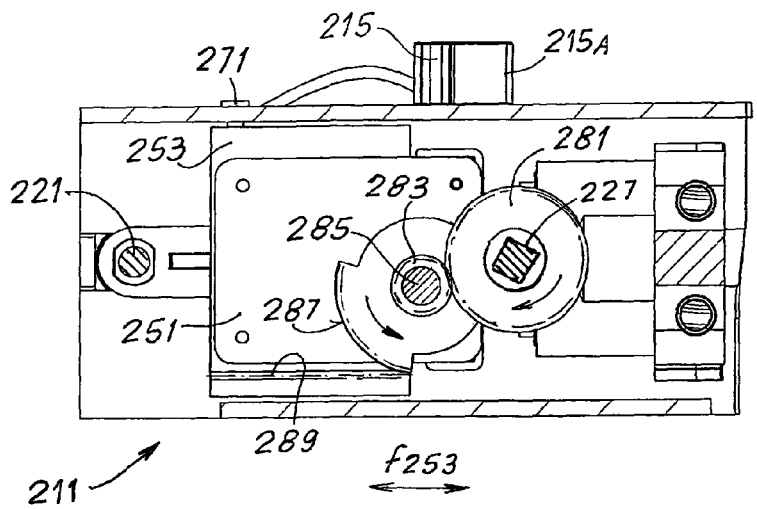
Figure 46:
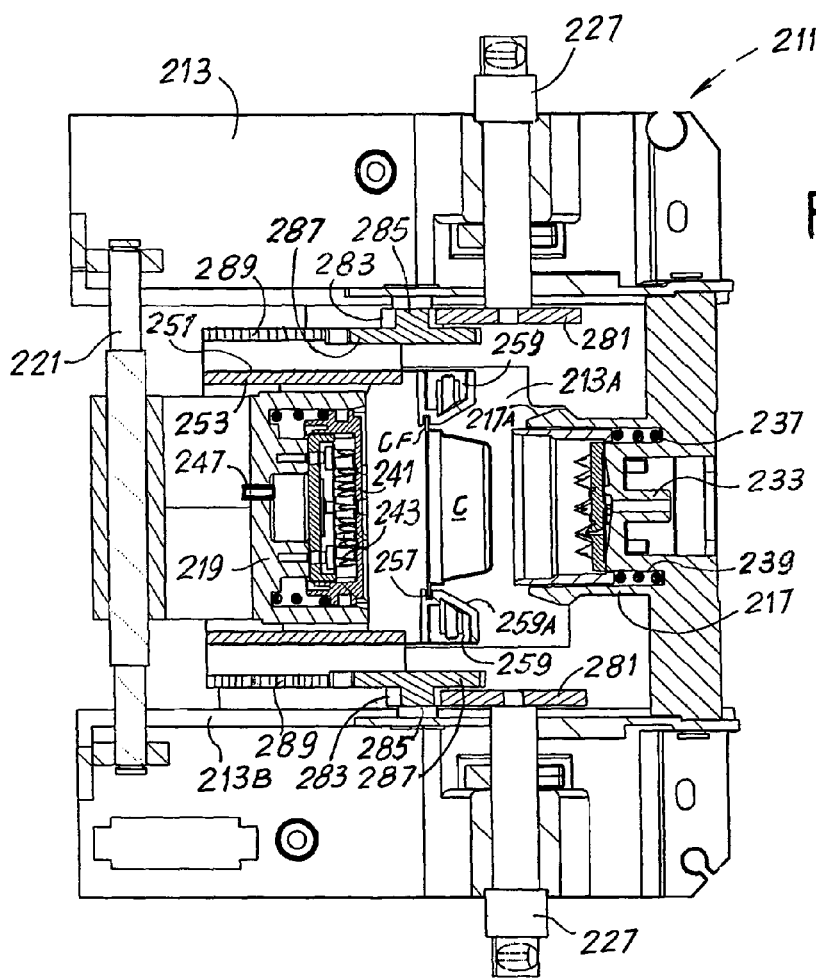
FIG. 46 shows a section according to XLVI-XLVI of FIG. 44.

In FIGS. 44, 45, and 46, the movable portion 219 of the infusion chamber is in the position of maximum distance with respect to the fixed portion 217. The capsule C has been inserted through the hopper 215A in the channels 257 integral with the arms 251, which are designed as described above, for example in the form of an elastic foil. By rotating the pivot pins 227, the closing movement of the infusion chamber starts, with forward movement of the arms 251 and of the movable portion 219 of the infusion chamber towards the fixed portion 217 of the infusion chamber.

Figure 47:
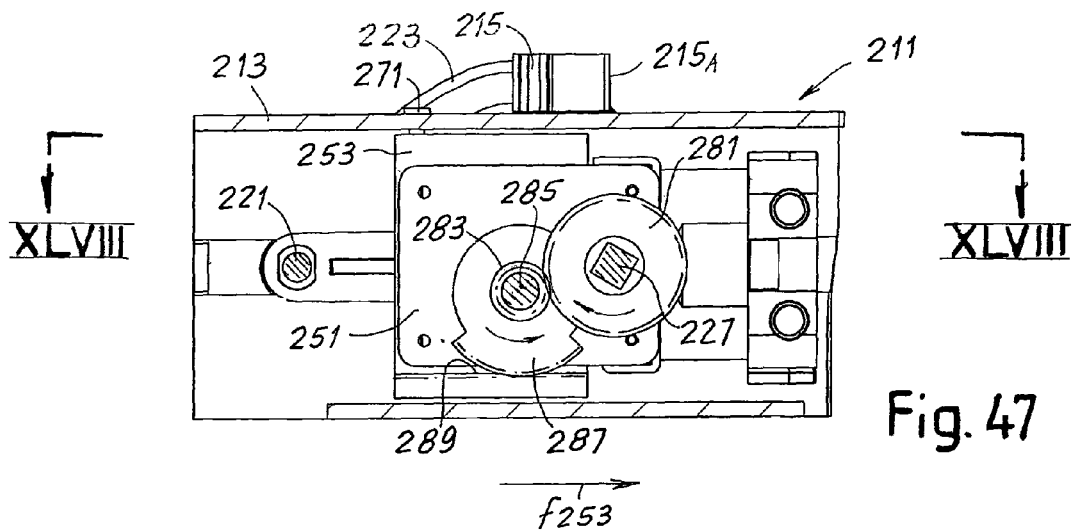
FIGS. 47 and 48 show sections similar to those of FIGS. 45 and 46 in a subsequent phase of the infusion cycle.
Figure 48:
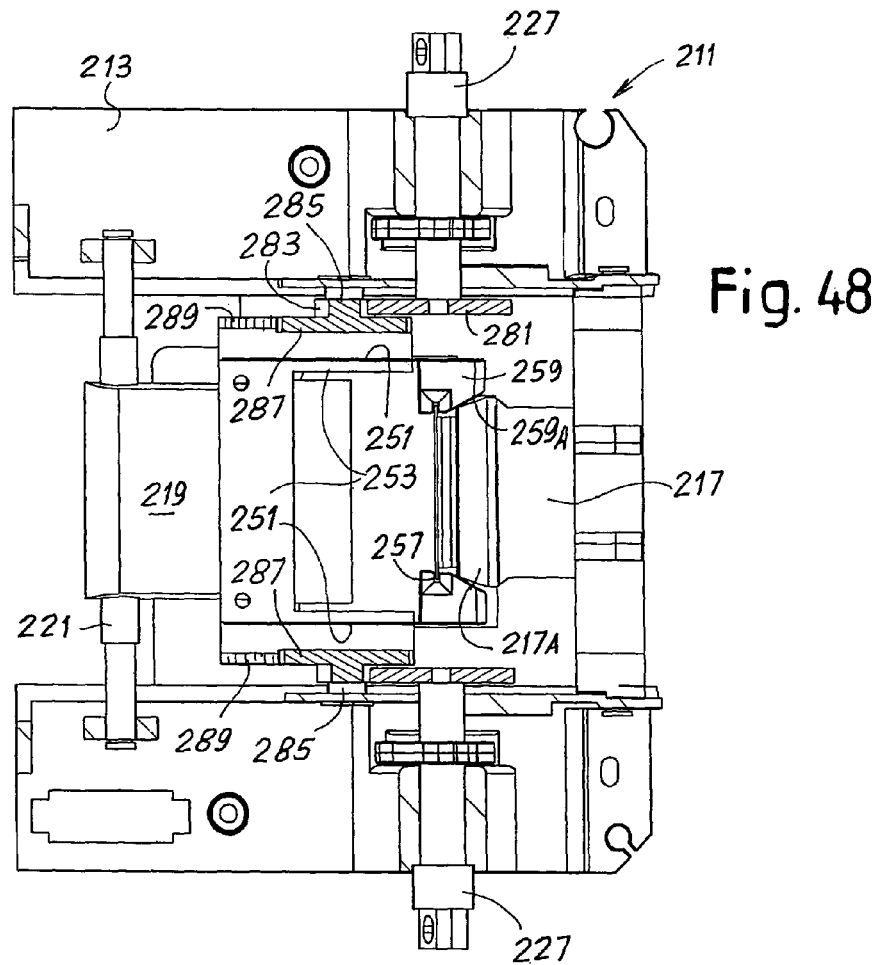

FIGS. 47 and 48 show the instant in which the capsule C has been almost completely inserted in the fixed portion 217 of the infusion chamber, and the projections 259 of the arms 251, provided with inclined surfaces 259A, come into contact with inclined surfaces 217A of the fixed portion 217 of the infusion chamber. As the movement of the support 253 of the arms 251 on one hand, and of the movable portion 219 of the infusion chamber on the other hand, are obtained through two different mechanisms, although starting from the same actuating pivot pins 227, as it can be easily understood by comparing FIGS. 45, 46 with FIGS. 47, 48, the movement of the support 253 and therefore of the arms 251 is in advance with respect to the movement of the movable portion 219 of the infusion chamber.

Figure 49:
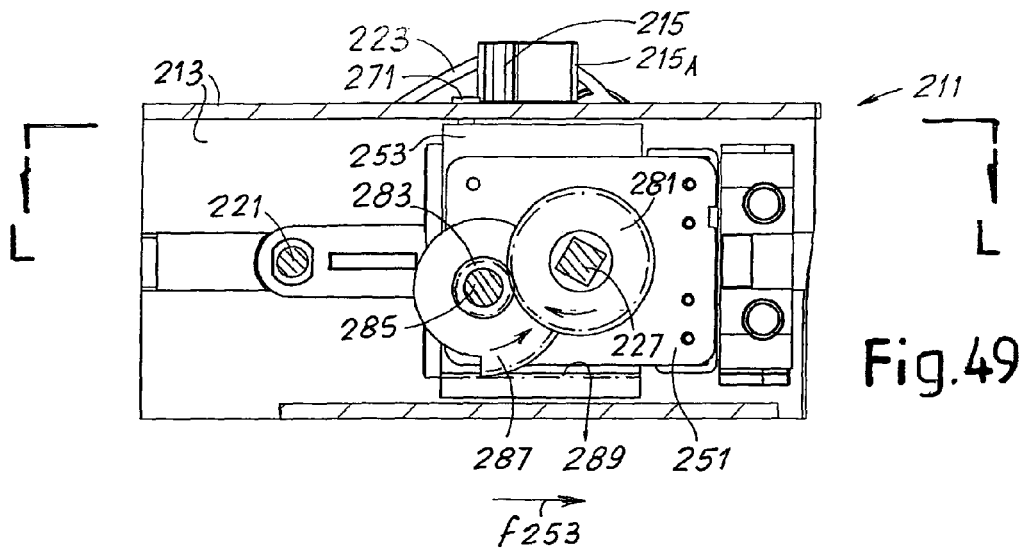
FIGS. 49 and 50 shows sections similar to those of FIGS. 47 and 48 in a subsequent closing phase of the infusion chamber.
Figure 50:
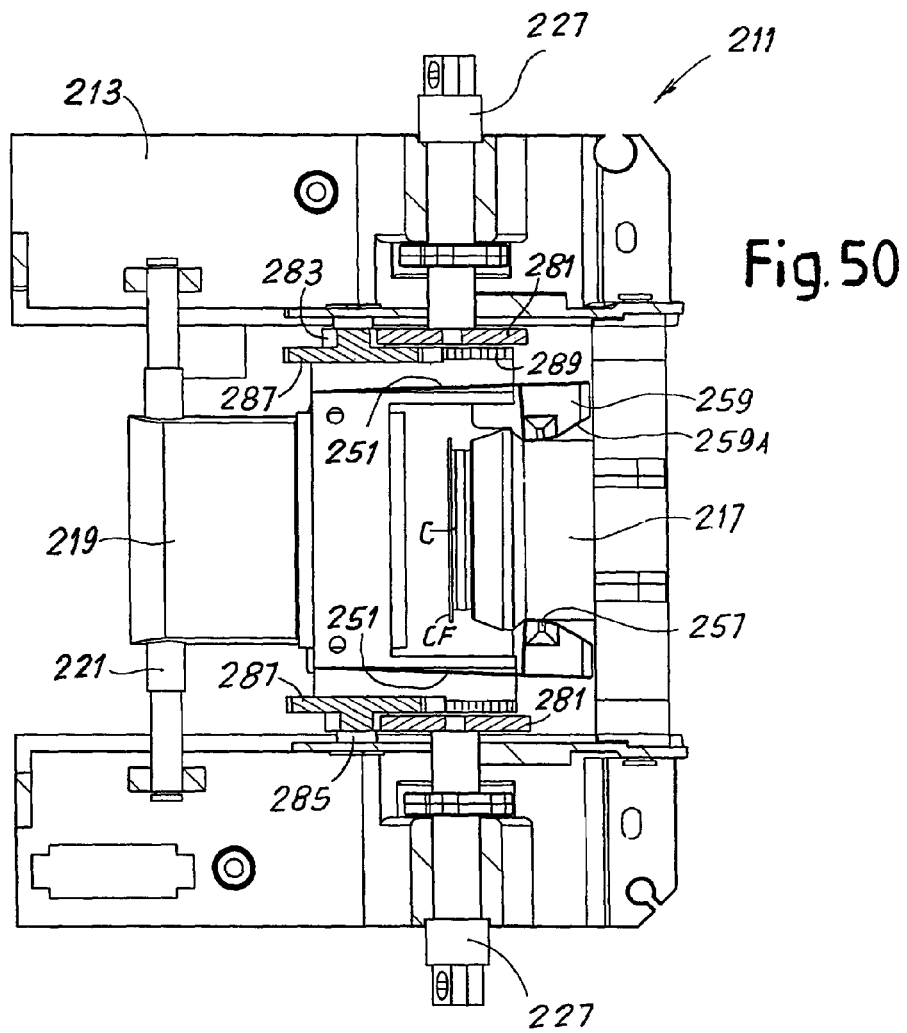

Continuing the movement, the arms 251 achieve their stop position, shown in FIGS. 49 and 50, before the infusion chamber is completely closed, i.e. before the movable portion 219 abuts against and seals the fixed portion 217. Thanks to the fact that the gear wheel 287 has a partial toothing, the further rotation of the pivot pins 227 does not affect the movement of the support 253 of the arms 251. These latter remain in the stop position of FIGS. 49 and 50, held here also thanks to the fact that the projections 259 passed beyond the inclined surfaces 217A and are held between them and an abutment formed on the frame 215.

Figure 51:
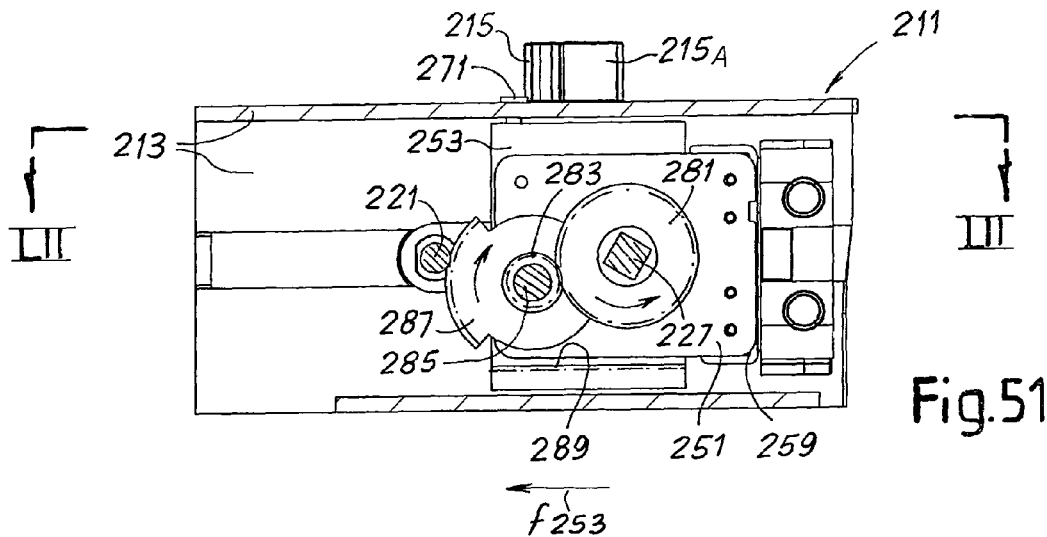
FIGS. 51 and 52 show the device during the dispensing phase.
Figure 52:
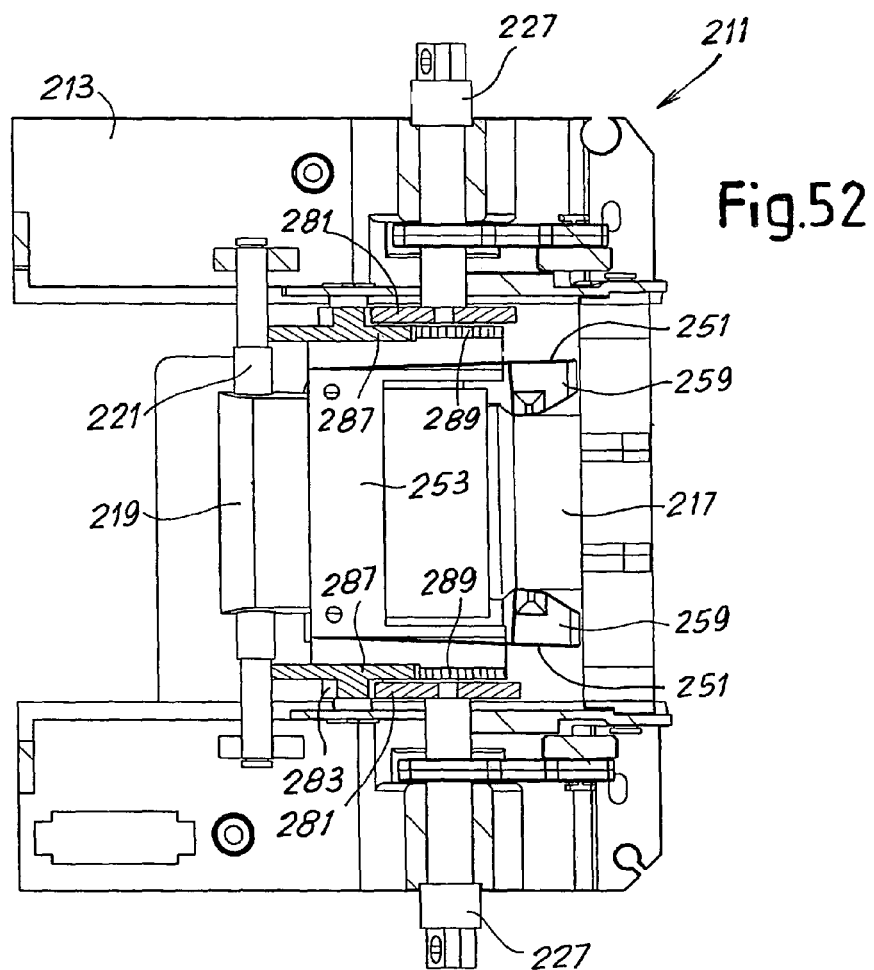

By further rotating the pivot pins 227 the complete closure of the infusion chamber is obtained, achieving the position illustrated in FIGS. 51 and 52, in which the dispensing of the beverage occurs.

At this point, by inverting the rotation movement of the pivot pins 227, the infusion chamber starts to open before the arms 251, with the support 253, leave their stop position achieved in FIGS. 49 and 50. This is possible thanks to the fact that the gear wheels 287 has only a partial toothing, and therefore in the initial phase of the inverse movement of rotation of the mechanism they do not engage with the racks 289.

Figure 53:
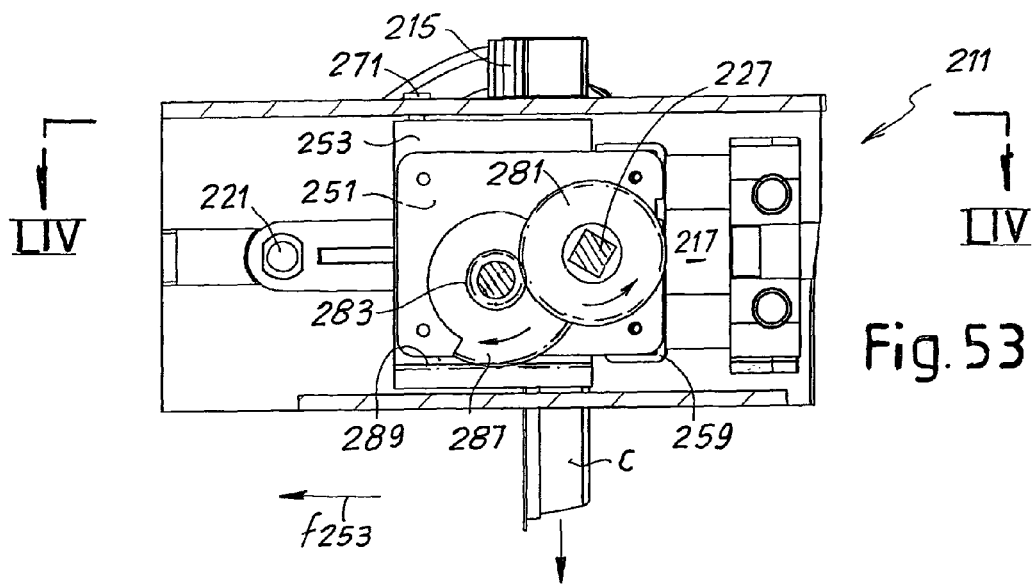
FIGS. 53 and 54 show sections similar to those of FIGS. 51 and 52 in the position of releasing the used capsule.
Figure 54:
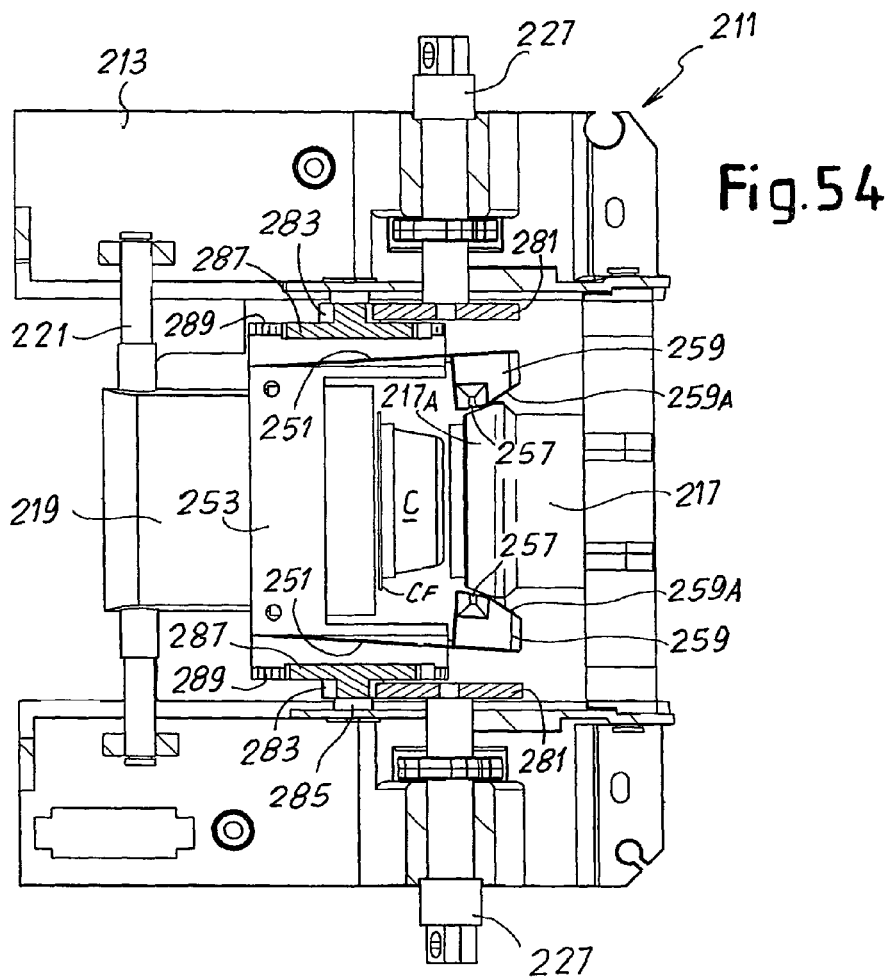

By continuing the rotation of the pivot pins 227, also the opening movement of the arms 251 starts, i.e. their displacement away from the fixed portion 217 of the infusion chamber as illustrated in FIGS. 53 and 54, thanks to the engagement between the toothed sectors of the wheels 287 and the racks 289. The capsule C is ejected from the fixed portion 217 of the infusion chamber through the ejector 235 before the arms return in their closed position and thus said arms and the related channels 257 do not interact with the capsule C during the ejecting phase.

By continuing the rotation in the opening direction of the pivot pins 227, the device will return in the initial position of FIGS. 43 to 46, in order to start a new delivery cycle.

It is understood that the drawing merely shows an example provided purely as a practical embodiment of the finding, which may vary in forms and arrangements without however departing from the scope of the concept on which the finding is based. Any reference numerals in the appended claims are provided for the purpose of facilitating reading thereof with reference to the description and to the drawing and do not limit the scope of protection represented by the claims.

The invention claimed is:

1. An infusion device for preparing a food product from single serving capsules, the device comprising:
an infusion chamber formed by a first portion and a second portion, movable with respect to each other in an opening and closing direction;
a first duct for feeding an infusion liquid in the infusion chamber;
a second duct for dispensing the food product from the infusion chamber;
two oscillating arms movable at least parallel to the opening and closing direction with respect to at least one of the first and second portion of the infusion chamber, and provided with retaining members for retaining a capsule in a space between the first and the second portion of the infusion chamber, when the infusion chamber is open and to insert the capsule inside the infusion chamber;
divaricating members for causing reciprocal divarication of the two arms and of the respective retaining members and the release of the capsule inside the infusion chamber;
in one of the first and second portion of the infusion chamber, an ejector for ejecting the capsule from the infusion chamber when the infusion cycle is ended;

members for temporarily deactivating the retaining members and the two arms when the first and the second portion of the infusion chamber are reciprocally withdrawn, in a deactivated condition the retaining members not interfering with the capsule during at least a part of the opening direction movement of the infusion chamber to eject the used capsule from the infusion chamber when an infusion cycle is ended, wherein the first portion of the infusion chamber is fixed and the second portion of the infusion chamber is movable with respect to a bearing frame, and wherein the two arms are constrained to the second portion of the infusion chamber and movable such that when the second portion of the infusion chamber is moved toward the closing direction, the two arms follow the movement of the second portion of the infusion chamber in a direction parallel to the closing direction until a stop position, passing through a position of release of the capsule in the first portion of the infusion chamber, the infusion chamber being closed through an over travel movement of the second portion of the infusion chamber in the closing direction when the two arms achieved the stop position and stopped movement in the direction parallel to the opening and closing direction.

2. The device as claimed in claim 1, wherein the two arms are movable, parallel to the opening and closing direction of the infusion chamber, with respect to both the first and the second portion of the infusion chamber.

3. The device as claimed in claim 1, comprising a return member which returns the two arms in a starting-stroke position of the arms with respect to the second portion of the infusion chamber.

4. The device as claimed in claim 3, wherein the return member is a magnetic member.

5. The device as claimed in claim 3, wherein the return member is an elastic member.

6. The device as claimed in claim 1, wherein the two arms move integrally with the second portion of the infusion chamber.

7. The device as claimed in claim 1, wherein the two arms are configured to move in a reciprocally approached direction and a reciprocally distanced direction, in the reciprocally approached direction the capsule retaining members being reciprocally approached to engage a capsule and in the reciprocally distanced direction the retaining members being divaricated to release the capsule.

8. The device as claimed in claim 1, wherein the two arms comprise engaging members for engagement in respective fixed guides, which control a divarication and reciprocal approaching movement of the two arms when the two arms move in the opening and closing direction of the infusion chamber to divaricate the two arms during closing of the infusion chamber and to bring the two arms closer during opening of the infusion chamber.

9. The device as claimed in claim 8, wherein the engaging members are constantly constrained to the respective fixed guides in any position of the two arms.

10. The device as claimed in claim 8, wherein each guide has a single path along which the respective engaging member moves in one direction or in the opposite direction during the opening and closing movement of the infusion chamber.

11. The device as claimed in claim 8, wherein each guide has a first forwards path and a second return path, the respective engaging member following the forwards path during the closing movement of the infusion chamber and the return path during the opening movement of the infusion chamber, the forwards path and the return path being at least partially different from each other, so that the two arms perform different movements respectively in the infusion chamber-closing stroke and in the infusion chamber-opening stroke.

12. The device as claimed in claim 8, wherein the reciprocal movement of the first and of the second portion of the infusion chamber is controlled by a connecting rod-crank mechanism and the two arms are carried by a support to translate the two arms with respect to the connecting rod.

13. The device as claimed in claim 1, wherein the two arms are carried by a support movable with respect to the first and the second portion of the infusion chamber.

14. The device as claimed in claim 13, comprising an actuating member for opening and closing the infusion chamber connected through a first kinematic connection to the second portion of the infusion chamber to move the second portion of the infusion chamber with respect to the first portion of the infusion chamber; and through a second kinematic connection to the support of the two arms to control the two arms with movement perpendicular to the opening and closing direction of the infusion chamber.

15. The device as claimed in claim 14, wherein the actuating member comprises a drive shaft, connected through the first kinematic connection to the second portion of the infusion chamber and through the second kinematic connection to the support of the two arms.

16. The device as claimed in claim 14, wherein the first kinematic connection comprises a connecting rod-crank mechanism.

17. The device as claimed in claim 14, wherein the second kinematic connection comprises a pinion and rack mechanism.

18. The device as claimed in claim 14, wherein the first kinematic connection and the second kinematic connection are designed and arranged in such a way that during closing of the infusion chamber, the two arms are in advance in the closing direction with respect to the second portion of the infusion chamber and during opening of the infusion chamber the two arms are delayed in the opening direction with respect to the second portion of the infusion chamber.

19. The device as claimed in claim 1, wherein the first portion of the infusion chamber comprises first opposing surfaces cooperating with the two arms to cause the divarication thereof and second opposing surfaces cooperating with the two arms to hold the two arms in a divaricated position through a portion of the movement of the second portion of the infusion chamber away from the first portion of the infusion chamber.

20. The device as claimed in claim 1, comprising a first pair of fixed elements which control the divarication of the two arms during closing of the infusion chamber and a second pair of fixed elements which control the reciprocal approach of the two arms during opening of the infusion chamber.

21. The device as claimed in claim 1, comprising a pump for the supply of pressurized hot water to the infusion chamber and a boiler for heating the water.

* * * * *